US012562019B2

(12) United States Patent
Lee et al.

(10) Patent No.: US 12,562,019 B2
(45) Date of Patent: Feb. 24, 2026

(54) CASSETTE HOLDER FOR AUTOMATED TELLER MACHINE

(71) Applicant: HYOSUNG TNS INC., Seoul (KR)

(72) Inventors: Jung Hwan Lee, Seoul (KR); Hyun Sung Chung, Gyeonggi-do (KR); Seul Hae Yoon, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 18/817,382

(22) Filed: Aug. 28, 2024

(65) Prior Publication Data

US 2025/0078601 A1 Mar. 6, 2025

(30) Foreign Application Priority Data

Sep. 1, 2023 (KR) ........................ 10-2023-0116175
Sep. 27, 2023 (KR) ........................ 10-2023-0130166

(51) Int. Cl.
*G07D 11/125* (2019.01)
*G07D 11/40* (2019.01)
*G07D 11/245* (2019.01)

(52) U.S. Cl.
CPC ........... *G07D 11/40* (2019.01); *G07D 11/125* (2019.01); *G07D 11/245* (2019.01); *G07D 2211/00* (2013.01)

(58) Field of Classification Search
CPC ...... G07D 11/12; G07D 11/125; G07D 11/24; G07D 11/245; G07D 11/40; G07D 13/00; G07D 2211/00
See application file for complete search history.

(56) References Cited

U.S. PATENT DOCUMENTS

| | | | | |
|---|---|---|---|---|
| 9,499,359 | B2 * | 11/2016 | Jeong | B65H 1/266 |
| 12,033,476 | B1 * | 7/2024 | Park | G07F 19/201 |
| 12,175,820 | B2 * | 12/2024 | Hamada | G07D 11/13 |

FOREIGN PATENT DOCUMENTS

| | | | |
|---|---|---|---|
| JP | 03091142 | A | 4/1991 |
| KR | 101628204 | B1 | 6/2016 |
| KR | 101628206 | B1 | 6/2016 |
| KR | 1020200082844 | A | 7/2020 |

OTHER PUBLICATIONS

Allowance Notice issued on Aug. 7, 2025, in corresponding Korean application No. 10-2023-0116175.

* cited by examiner

*Primary Examiner* — Thien M Le
*Assistant Examiner* — April A Taylor
(74) *Attorney, Agent, or Firm* — BACON & THOMAS, PLLC

(57) ABSTRACT

A cassette holder for an automated teller machine includes a first holding portion for holding a first cassette, a second holding portion for holding a second cassette, side links disposed at both side surfaces of the first holding portion, and a lock configured to lock or unlock the side links in a state in which the first holding portion is moved to a second position. The first holding portion is movable in the front-rear direction between a first position at which the first holding portion is positioned at a front side of the second holding portion to hold the first cassette in the first holding portion and the second position at which the first holding portion is positioned at a rear side of the second holding portion to hold the second cassette in the second holding portion.

13 Claims, 24 Drawing Sheets

[FIG. 1]
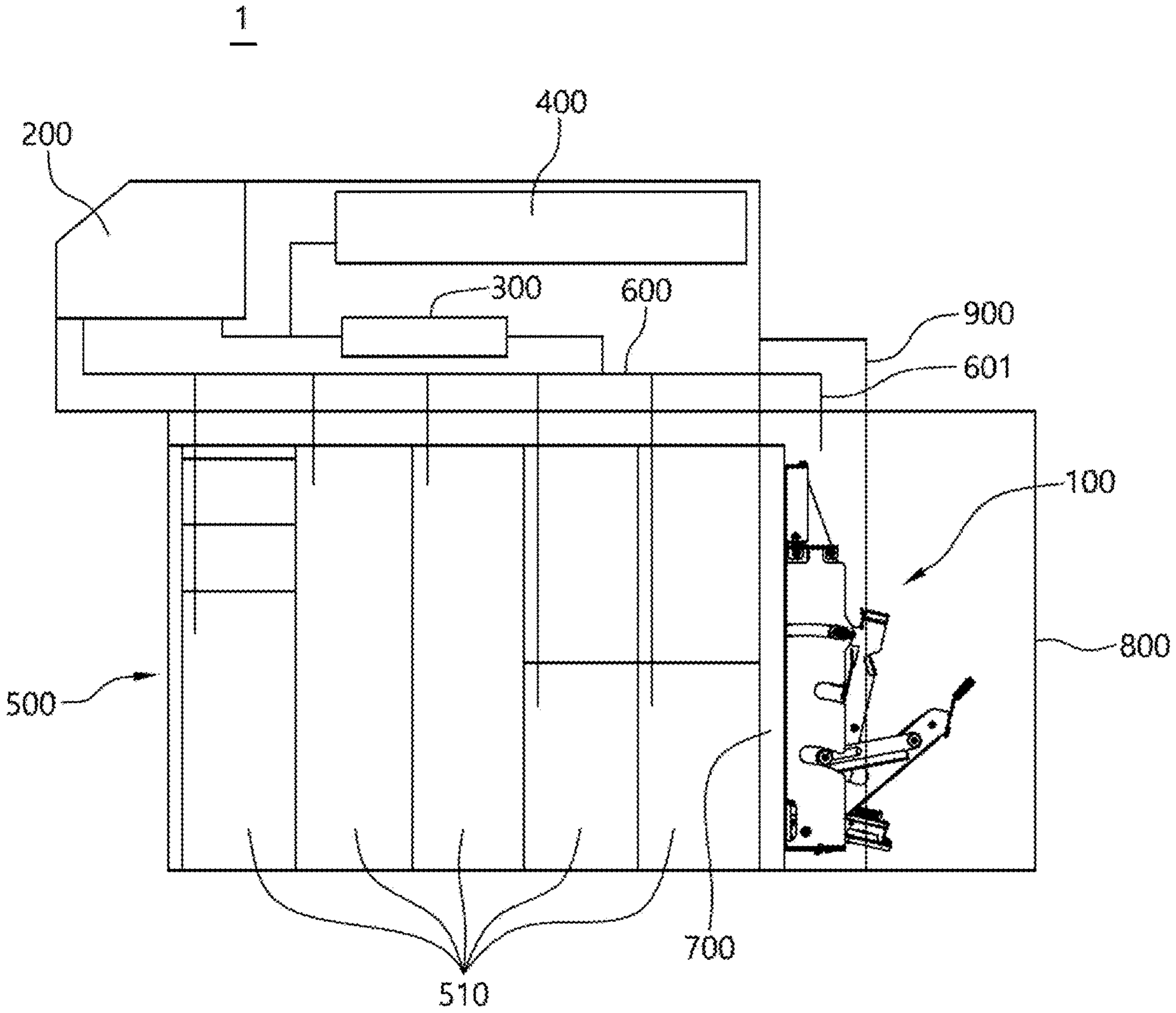

[FIG. 2]
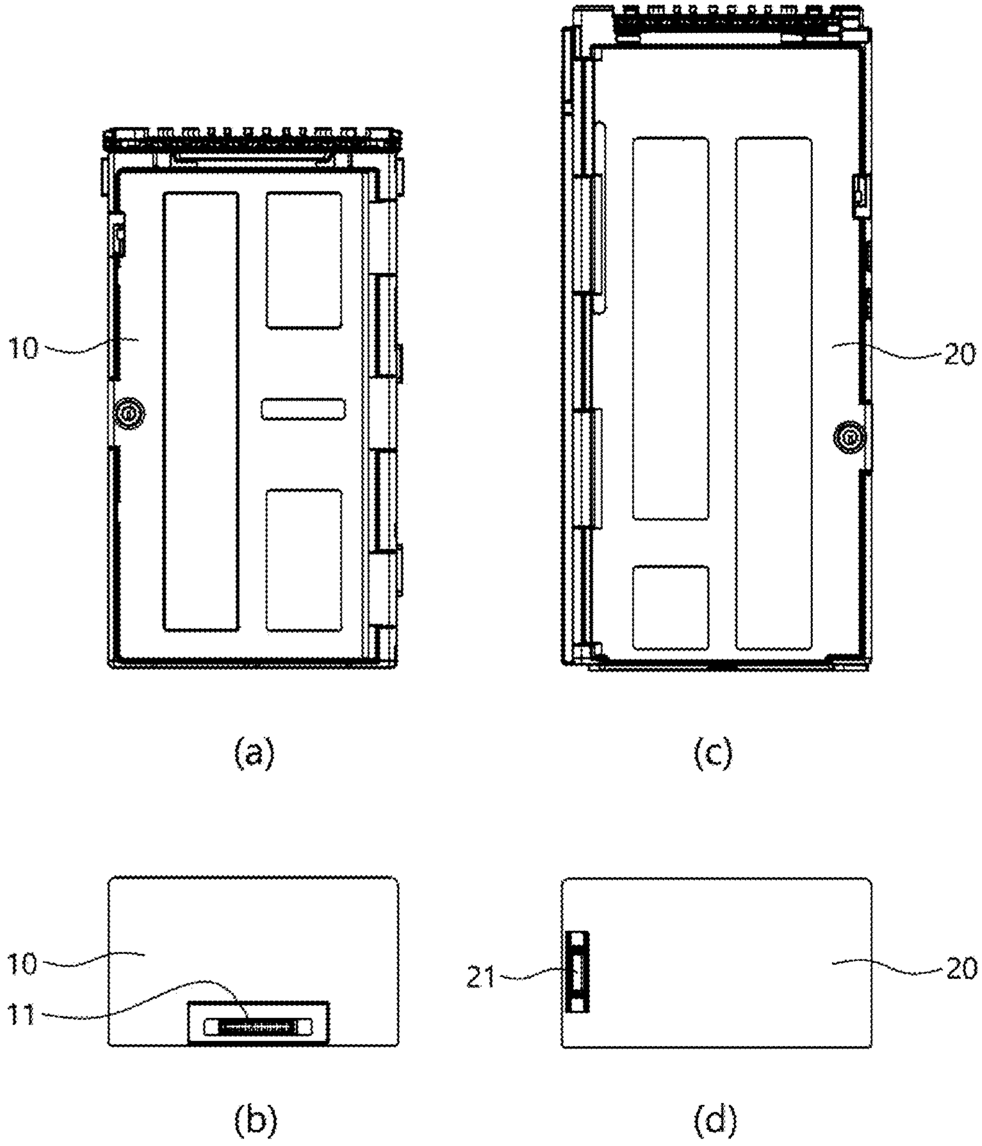

[FIG. 3]
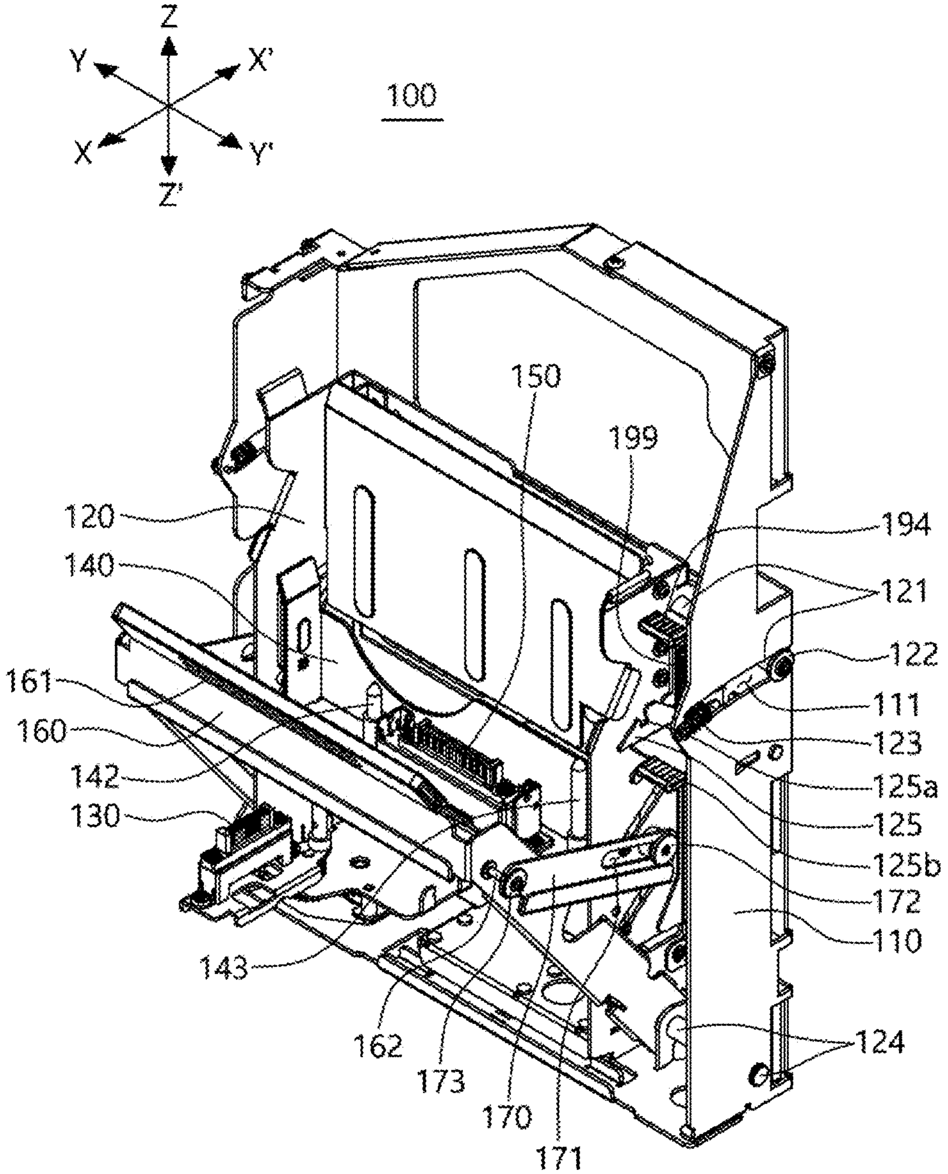

[FIG. 4]
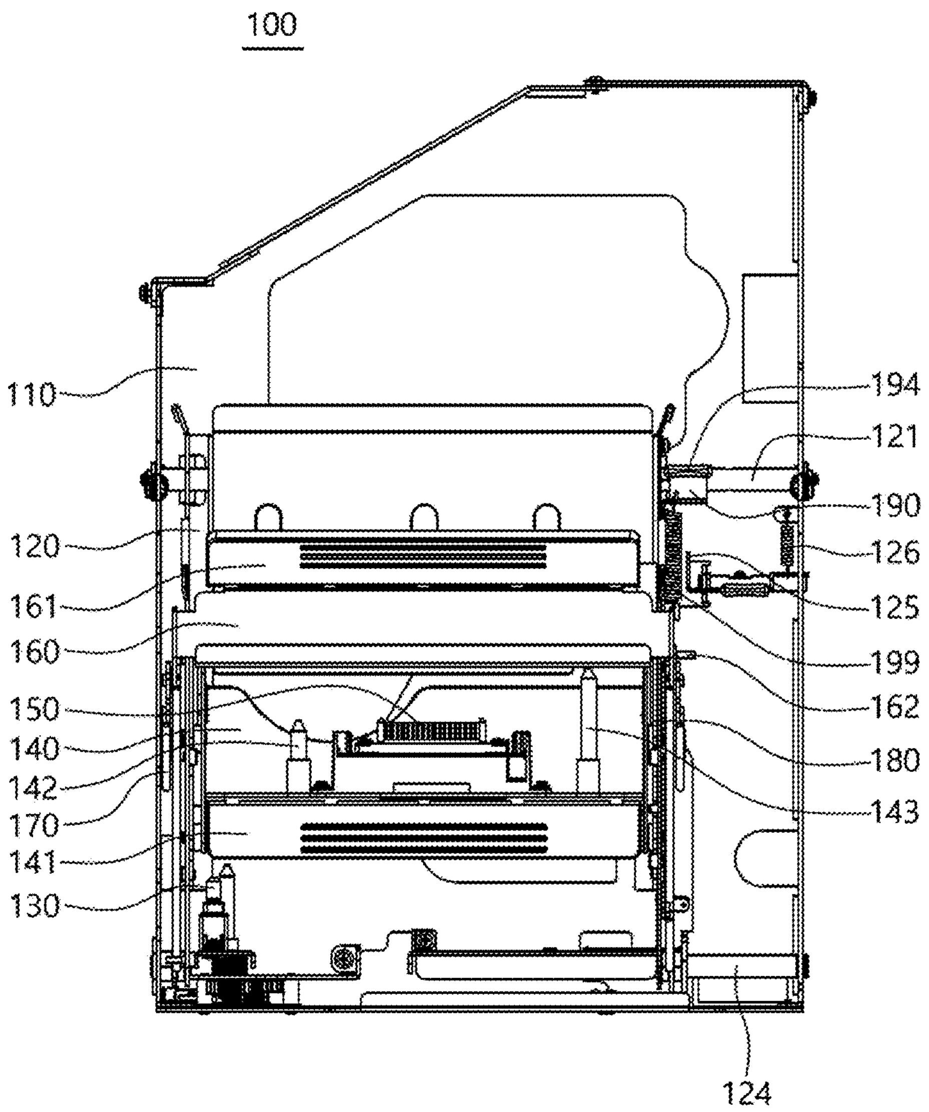

[FIG. 5]
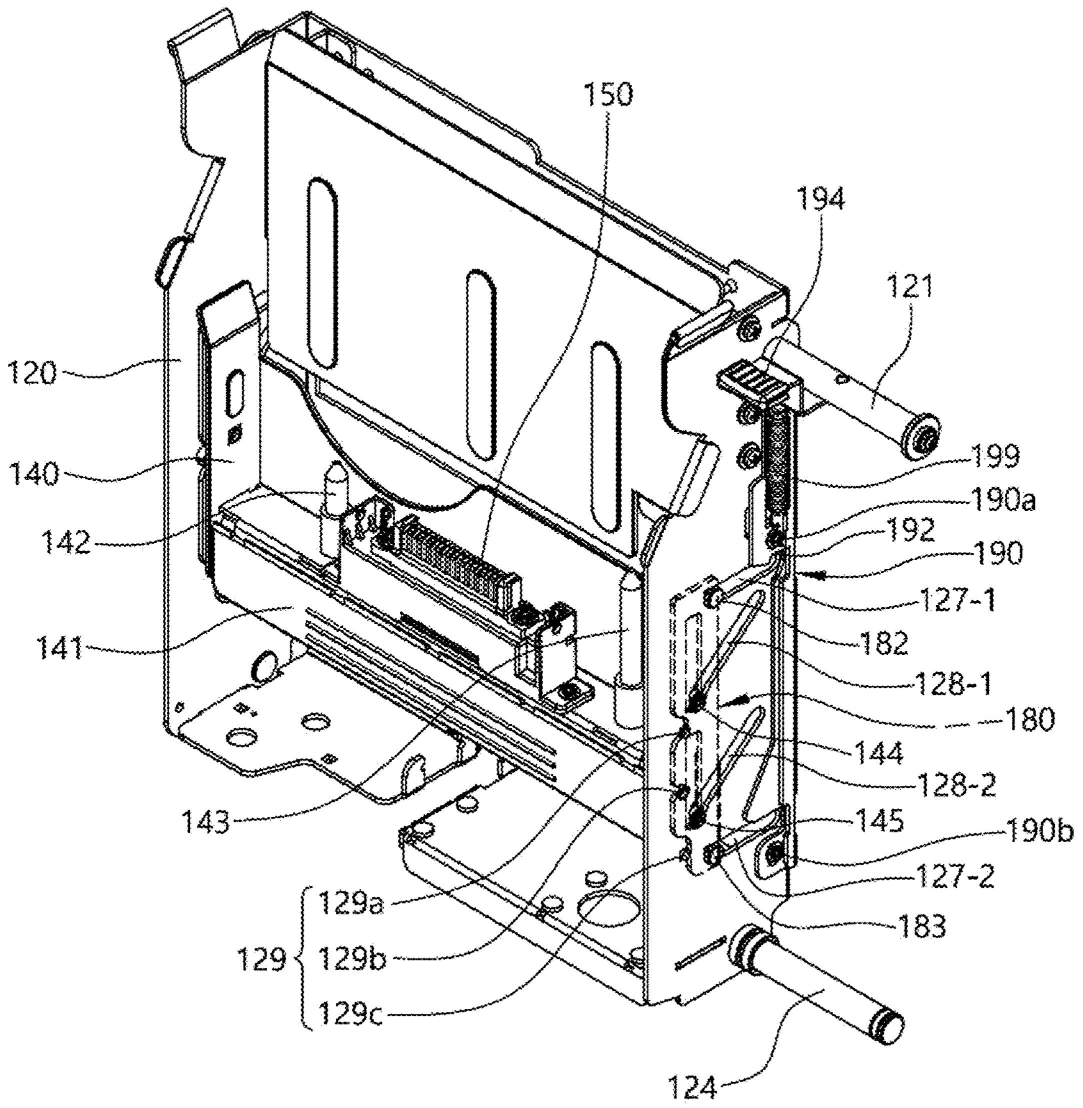

[FIG. 6]
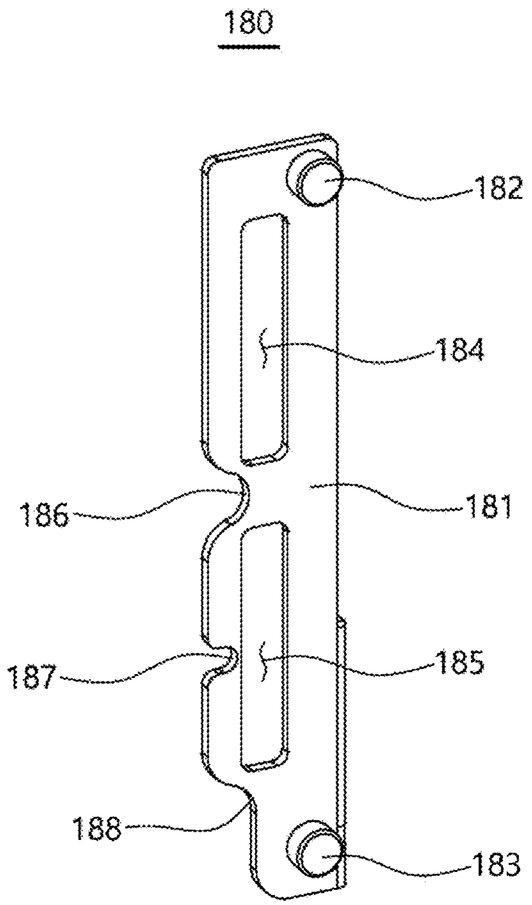

[FIG. 7]
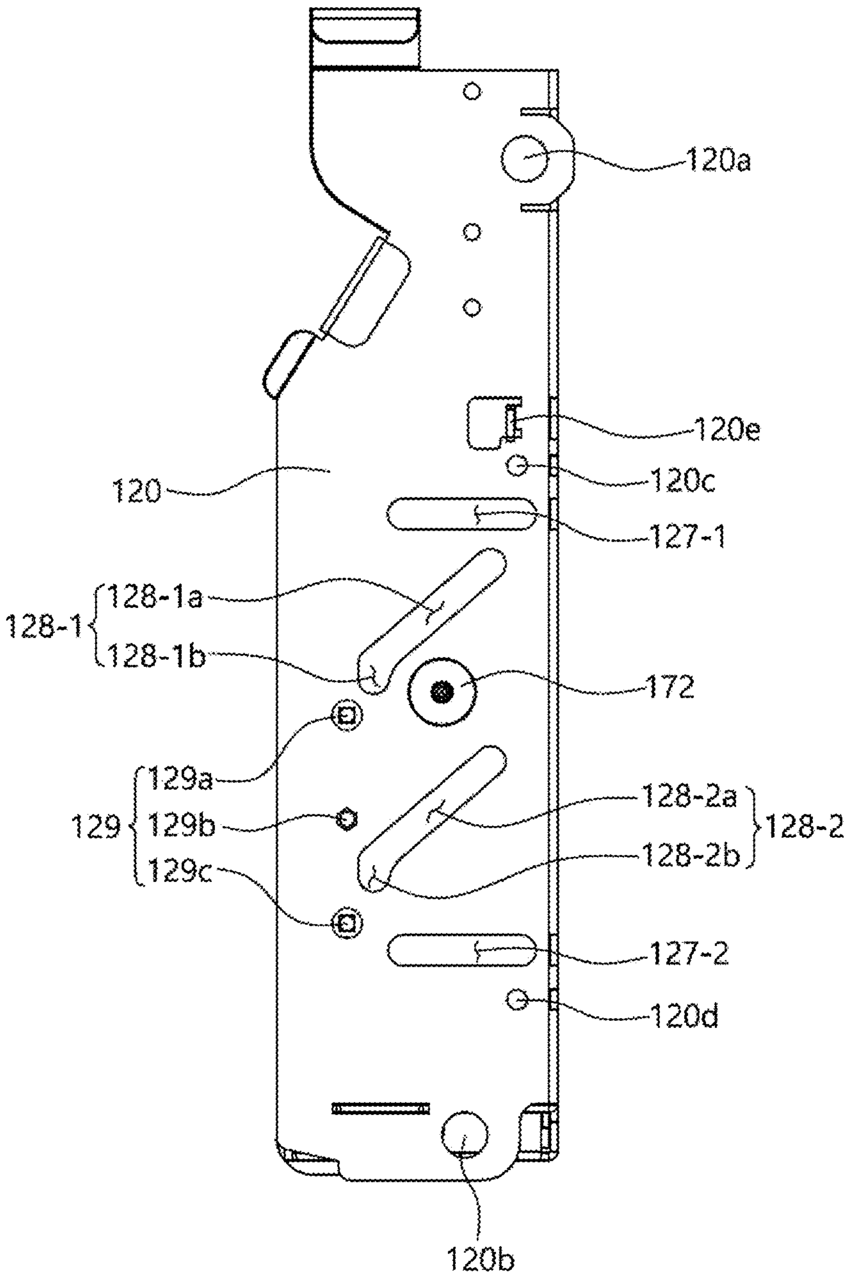

[FIG. 8]
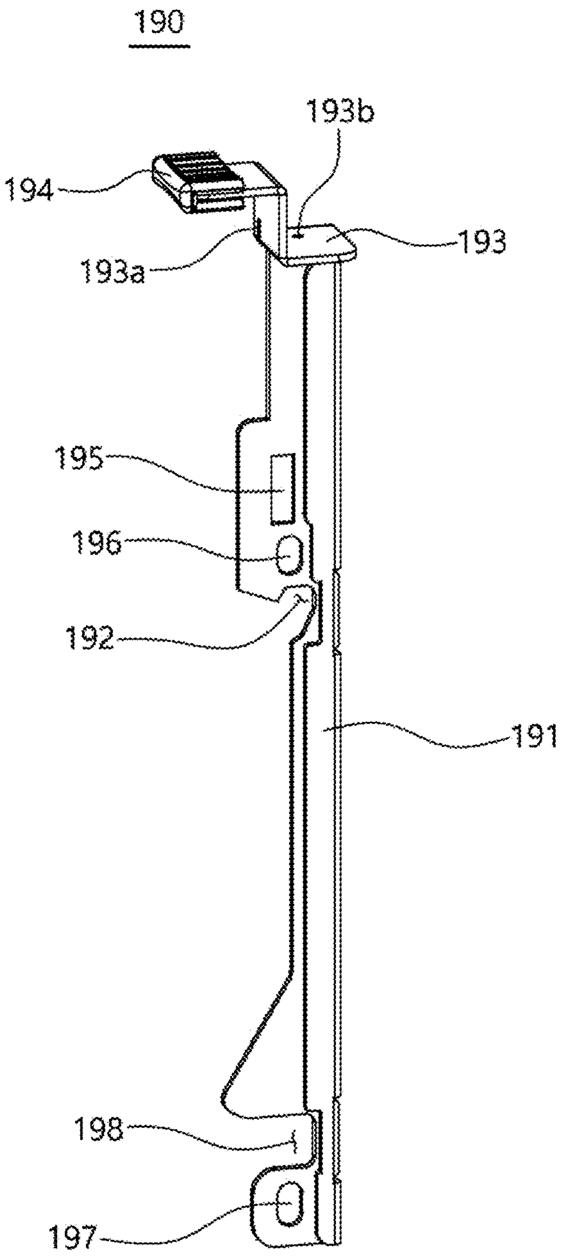

[FIG. 9]
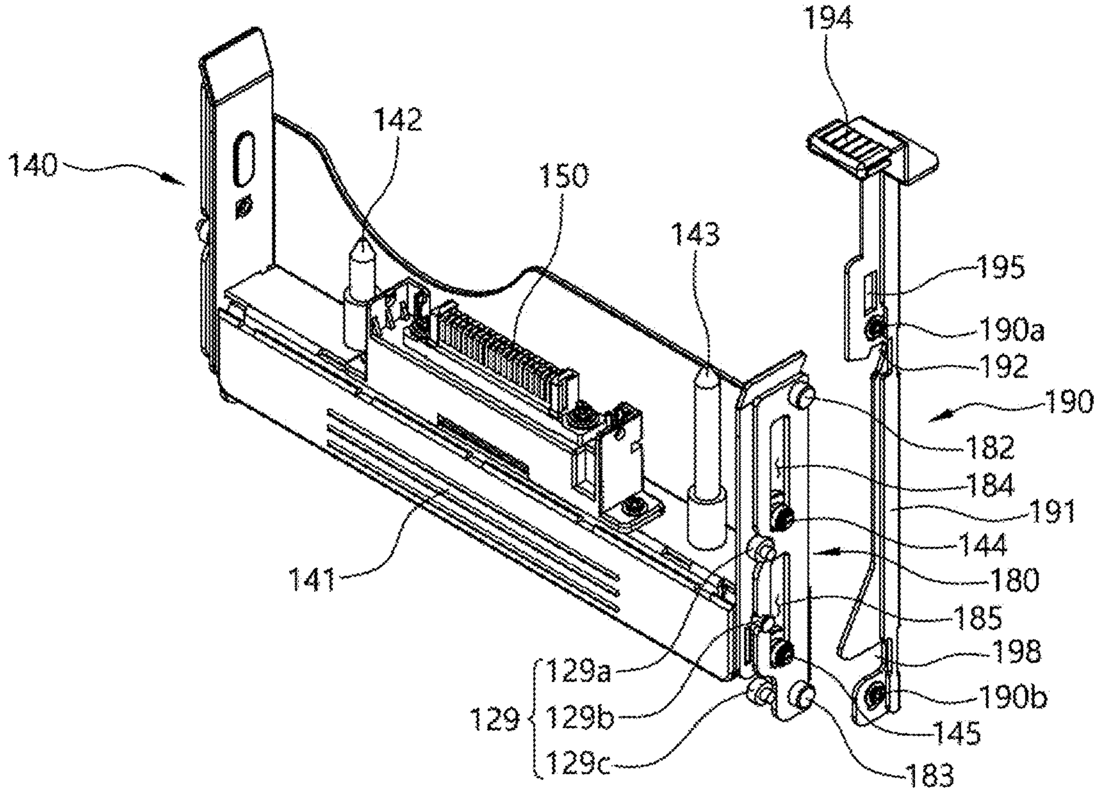

[FIG. 10]
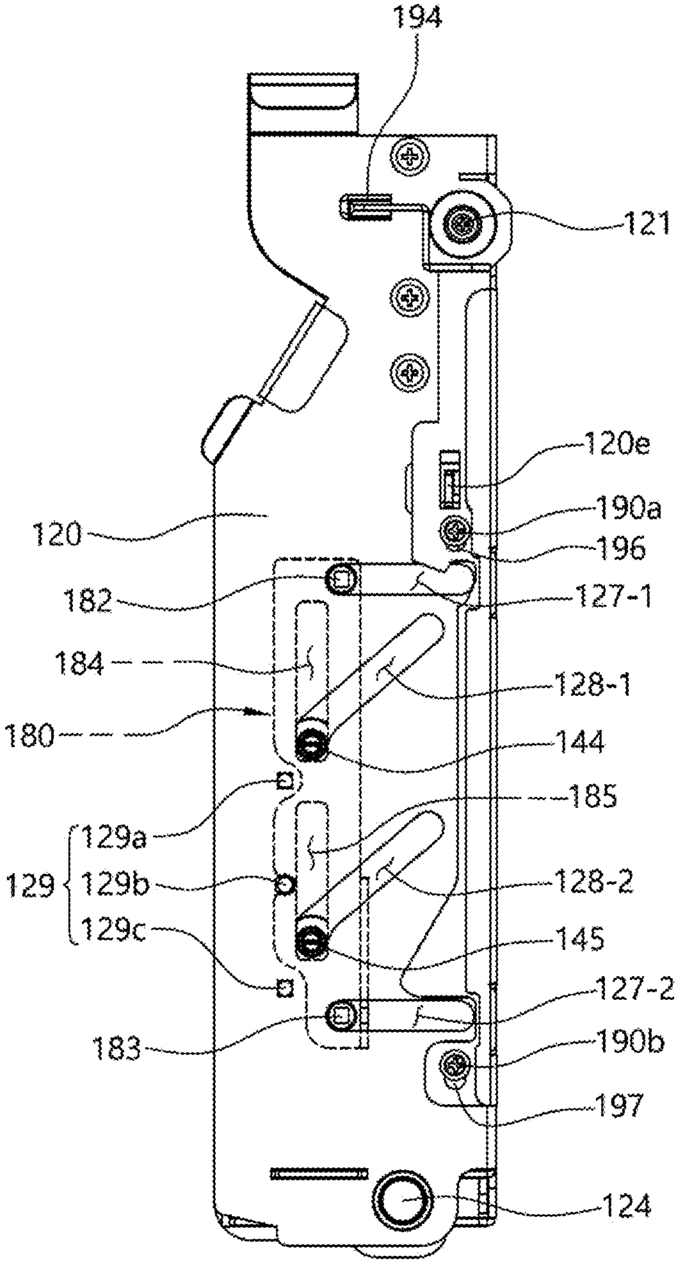

[FIG. 11]
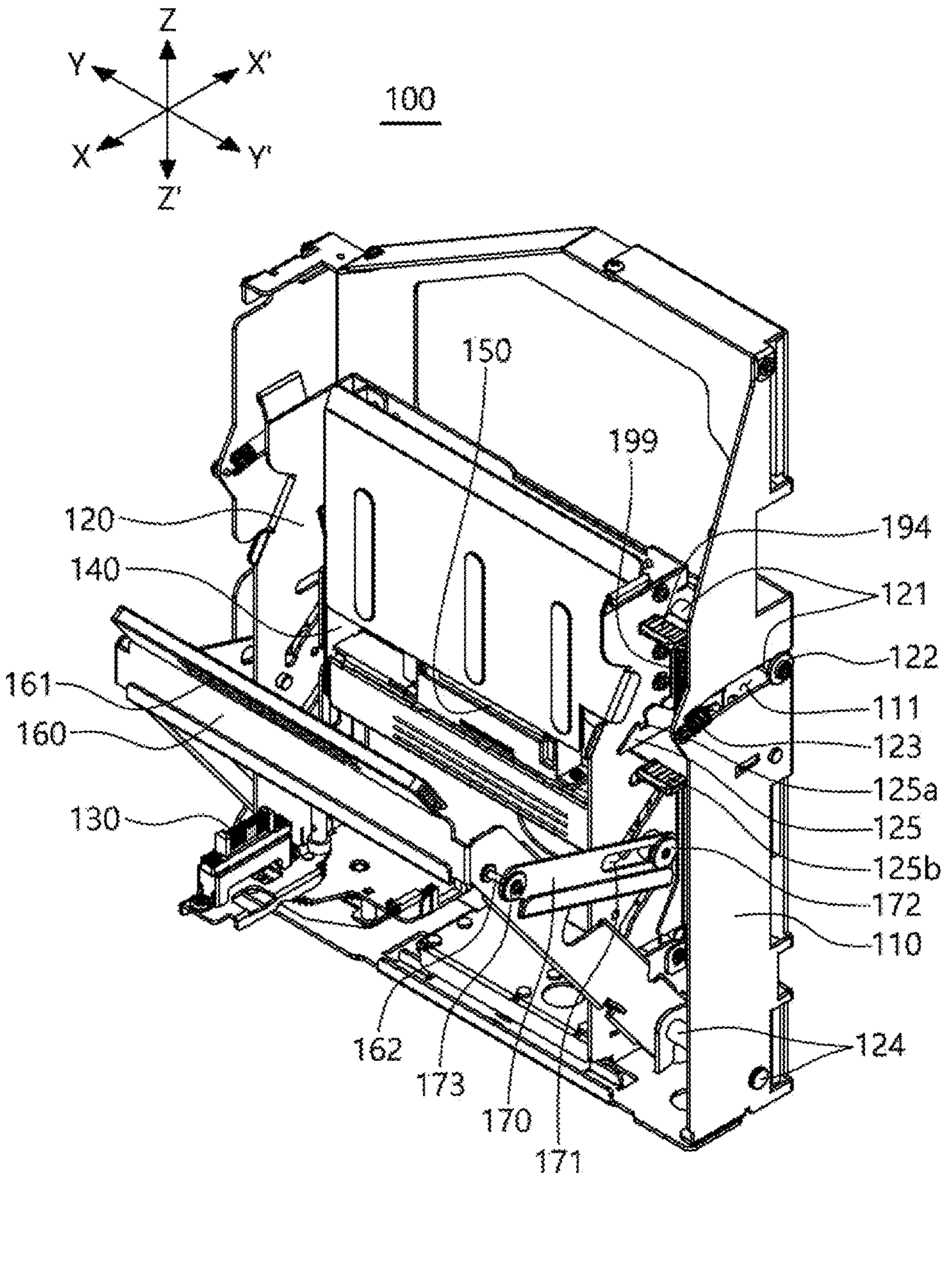

[FIG. 12]
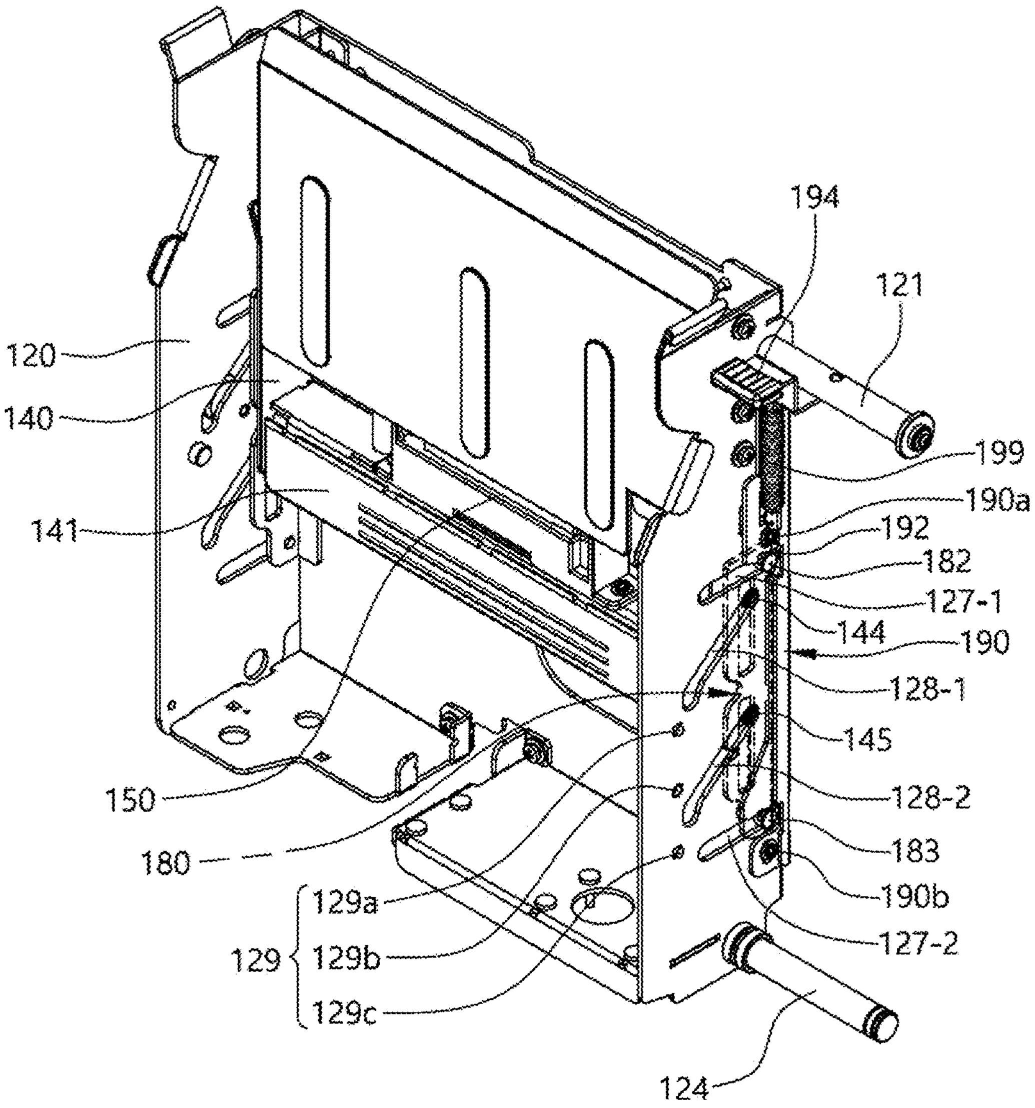

[FIG. 13]
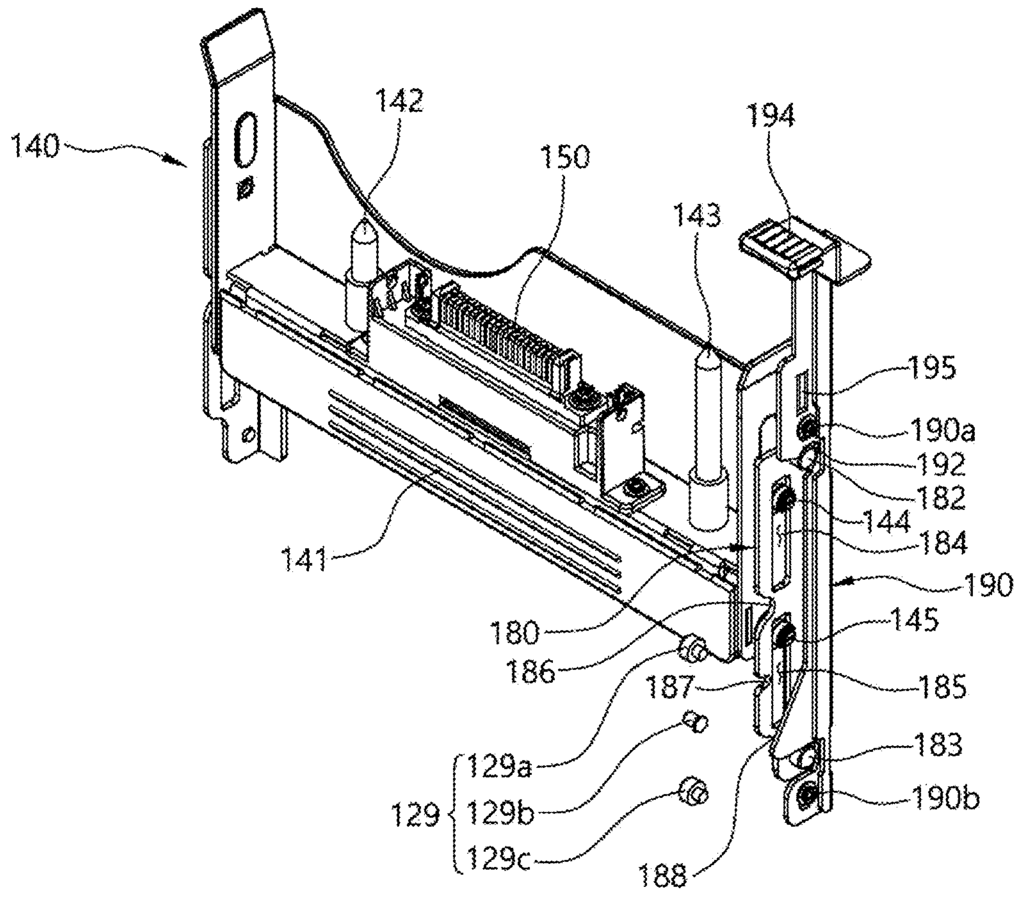

[FIG. 14]
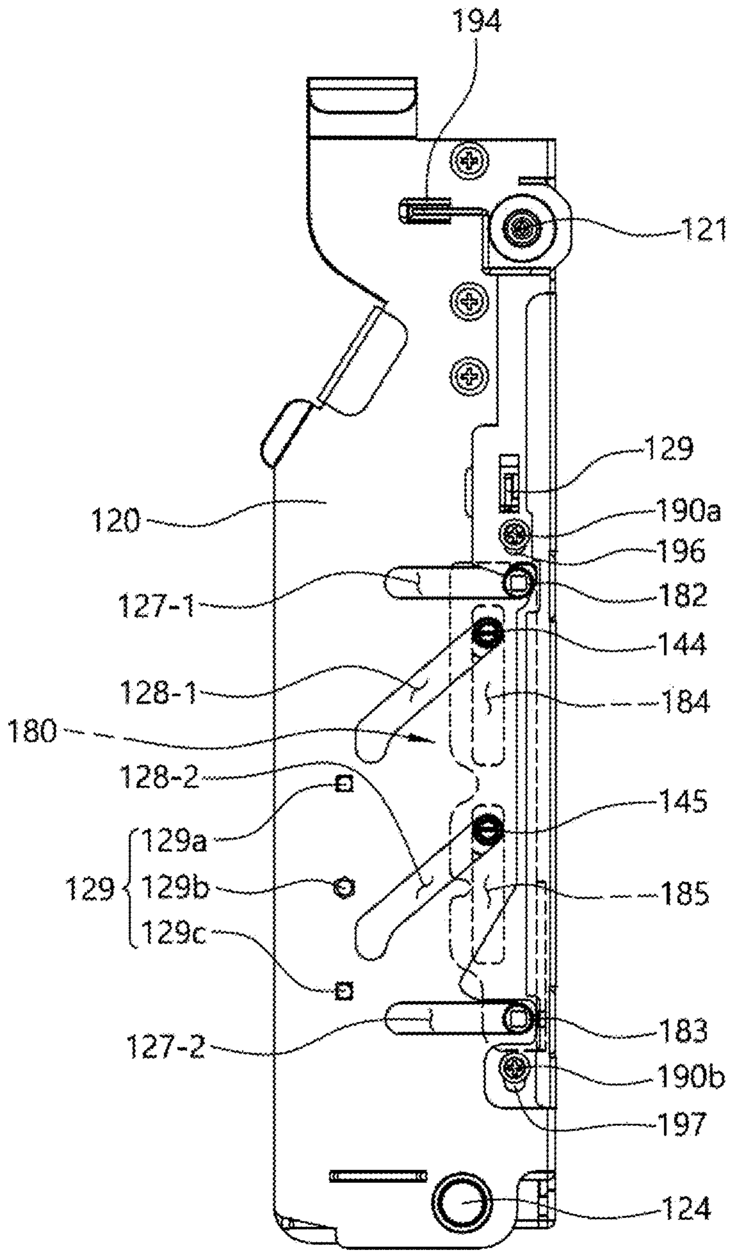

[FIG. 15]
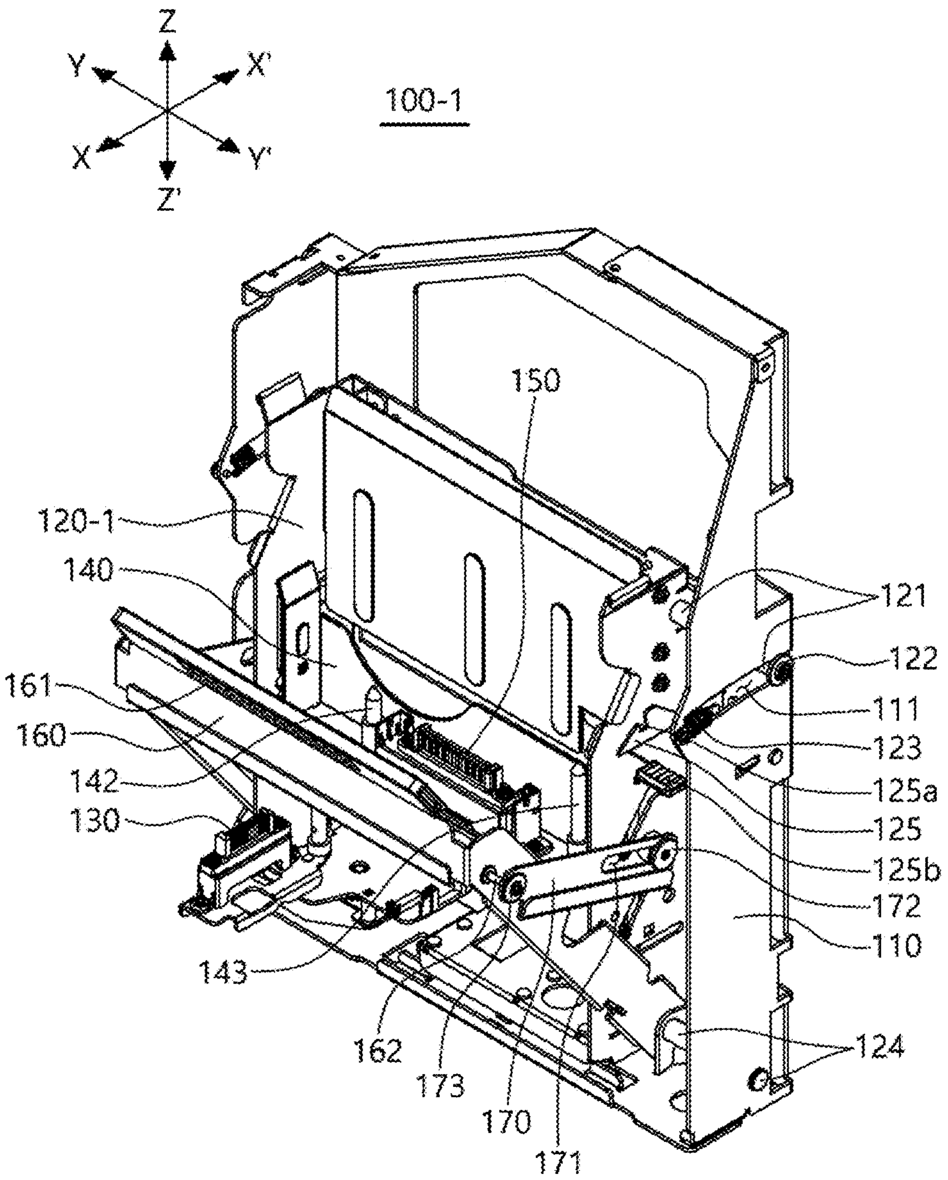

[FIG. 16]
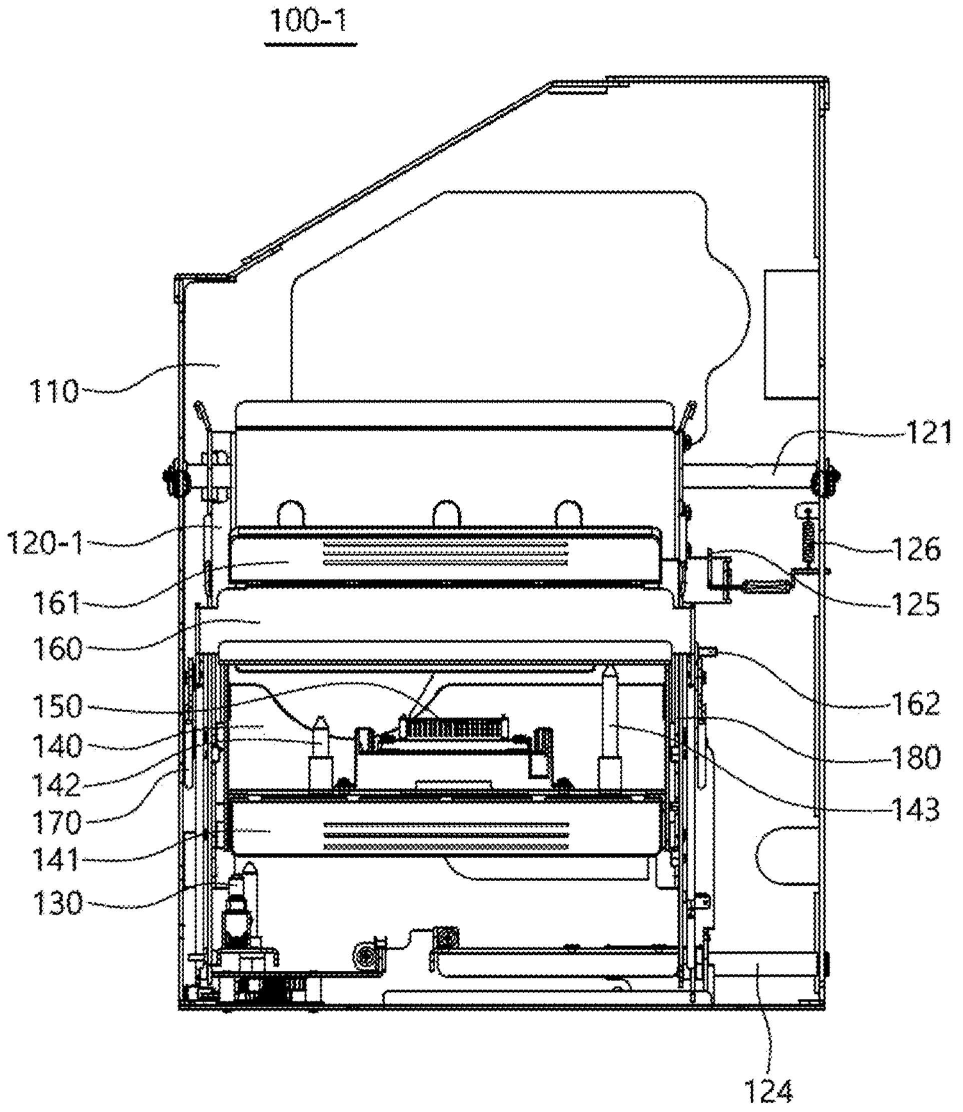

[FIG. 17]
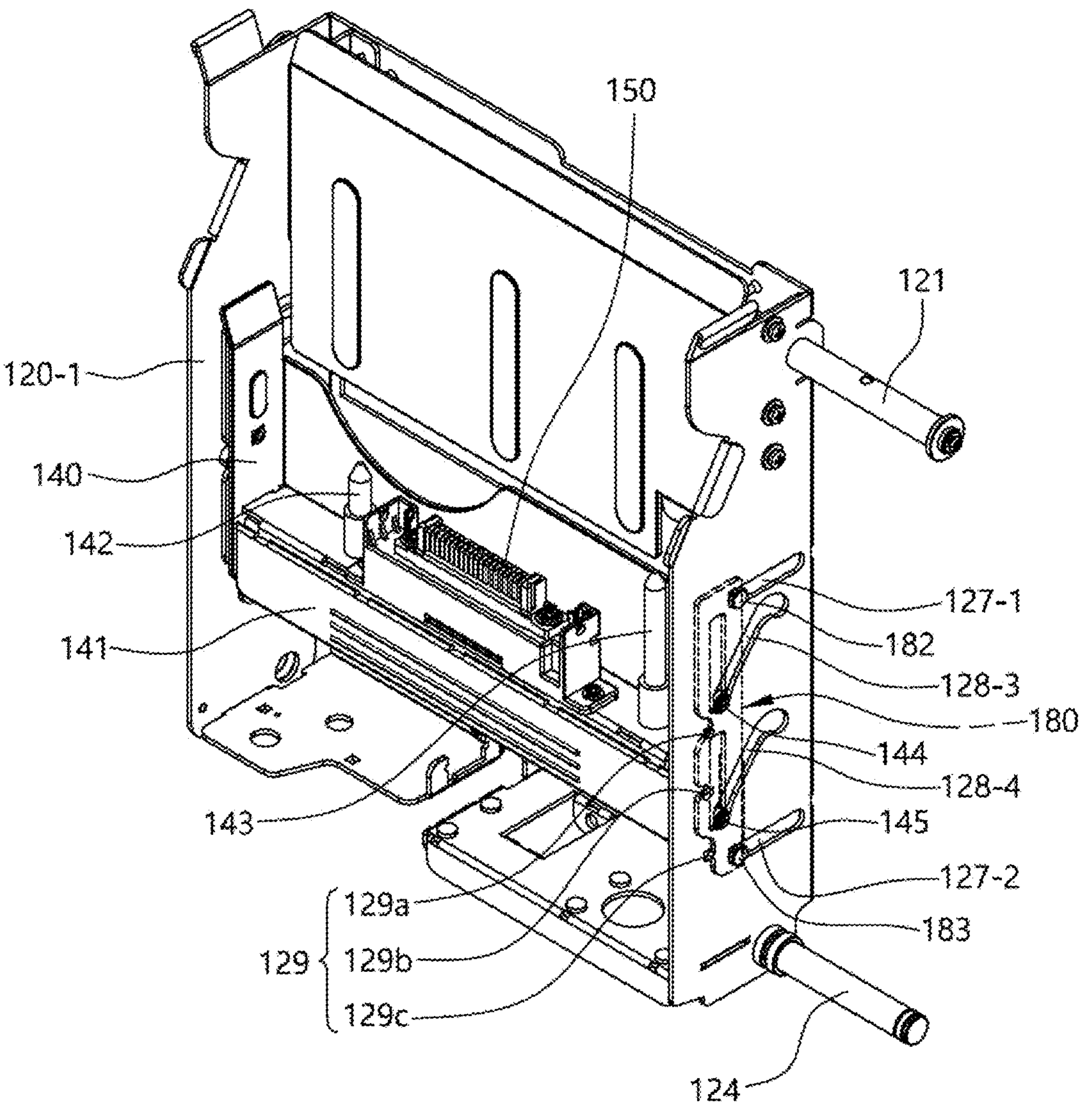

[FIG. 18]
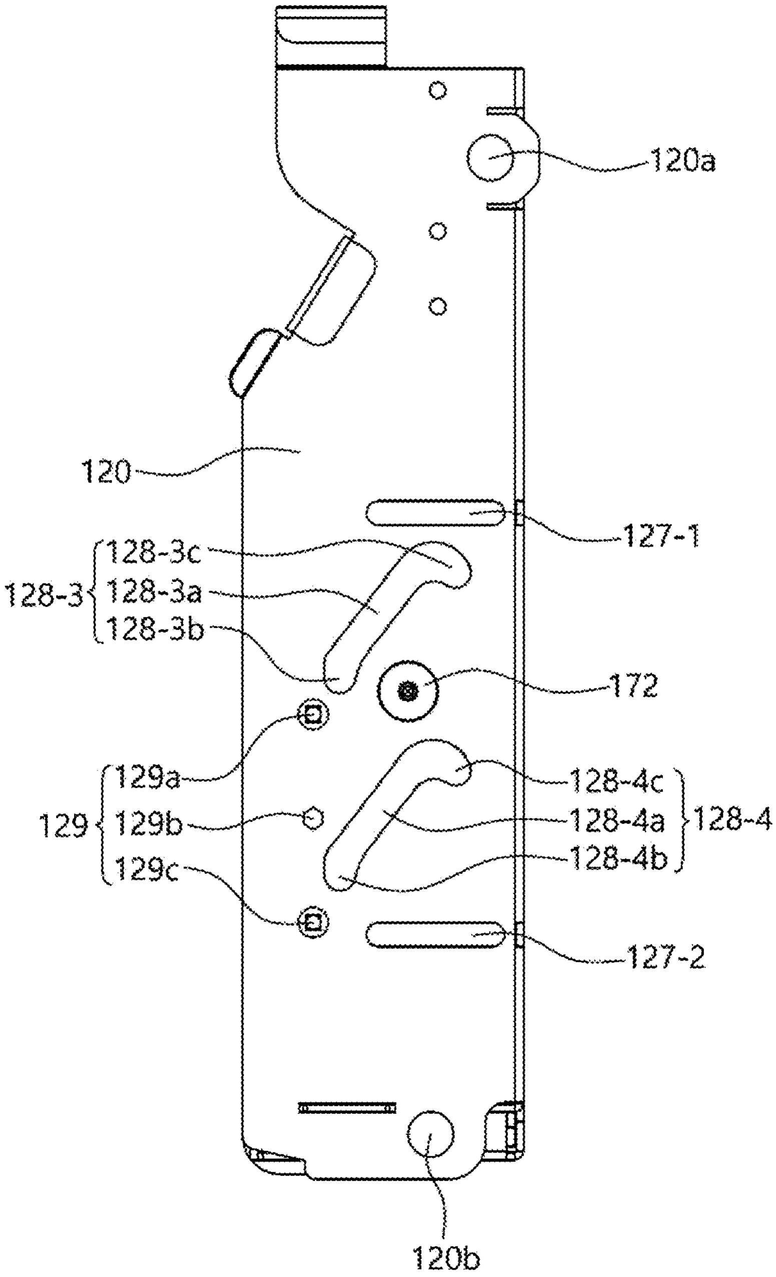

[FIG. 19]
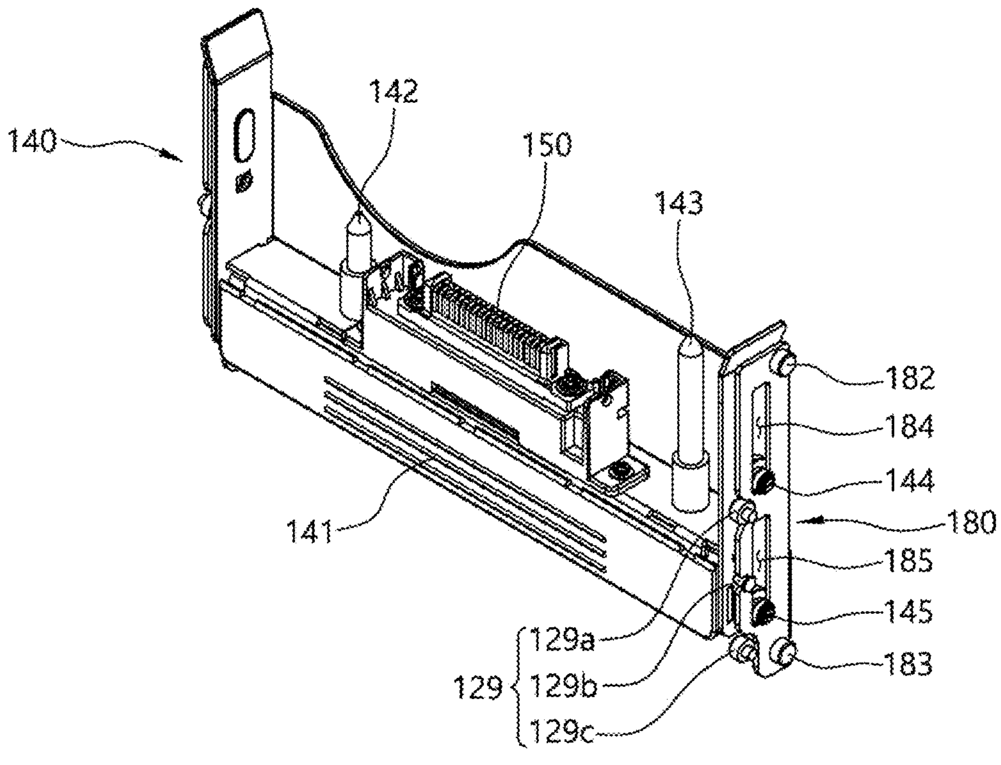

[FIG. 20]
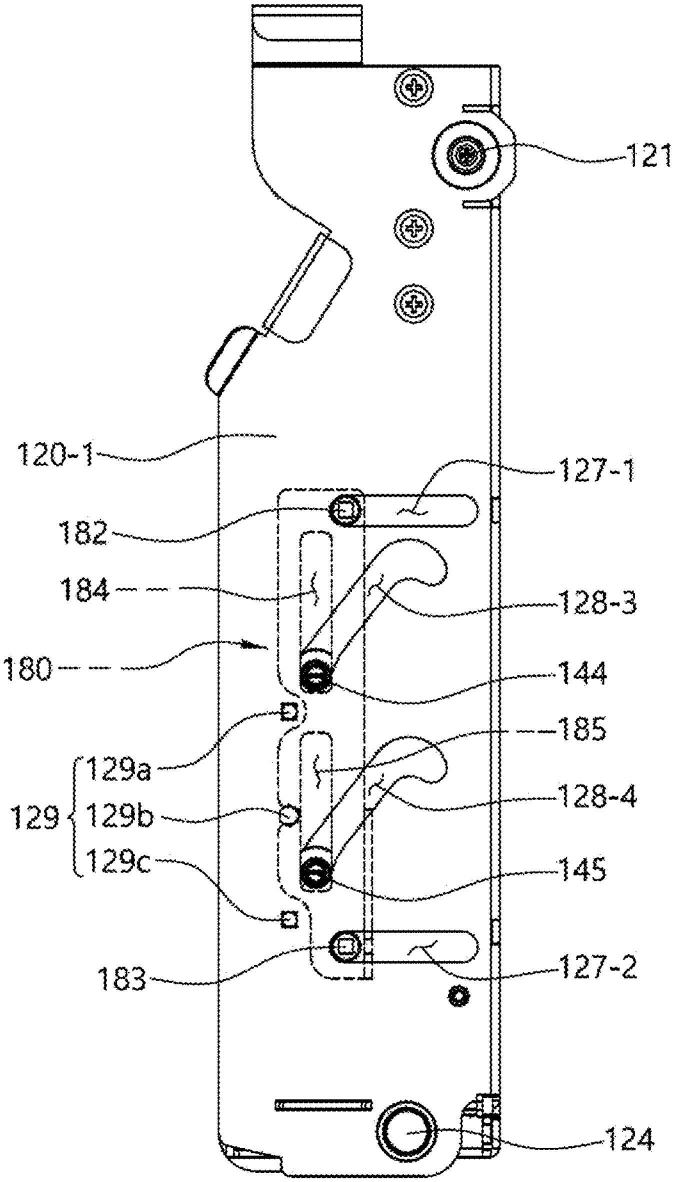

[FIG. 21]
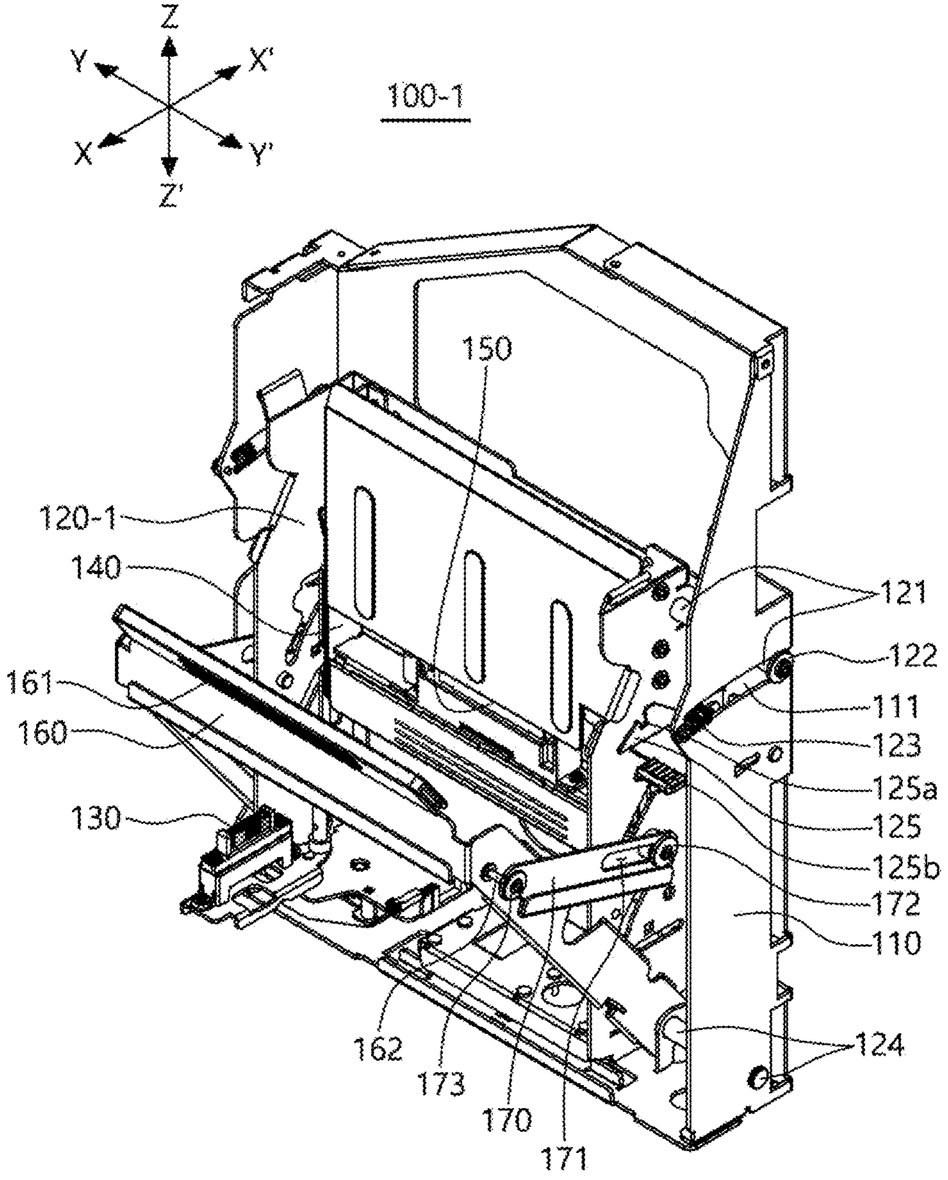

[FIG. 22]
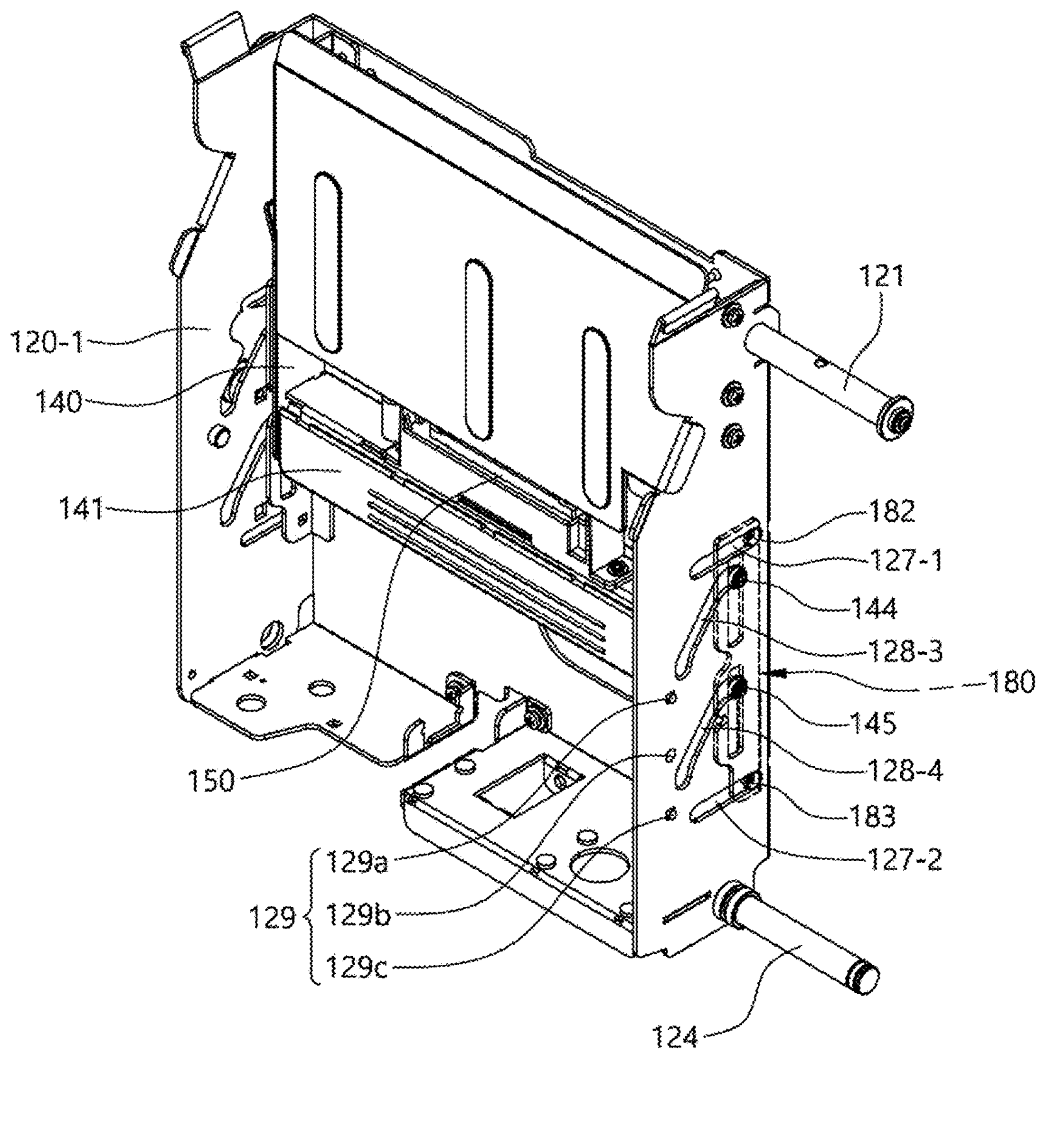

[FIG. 23]
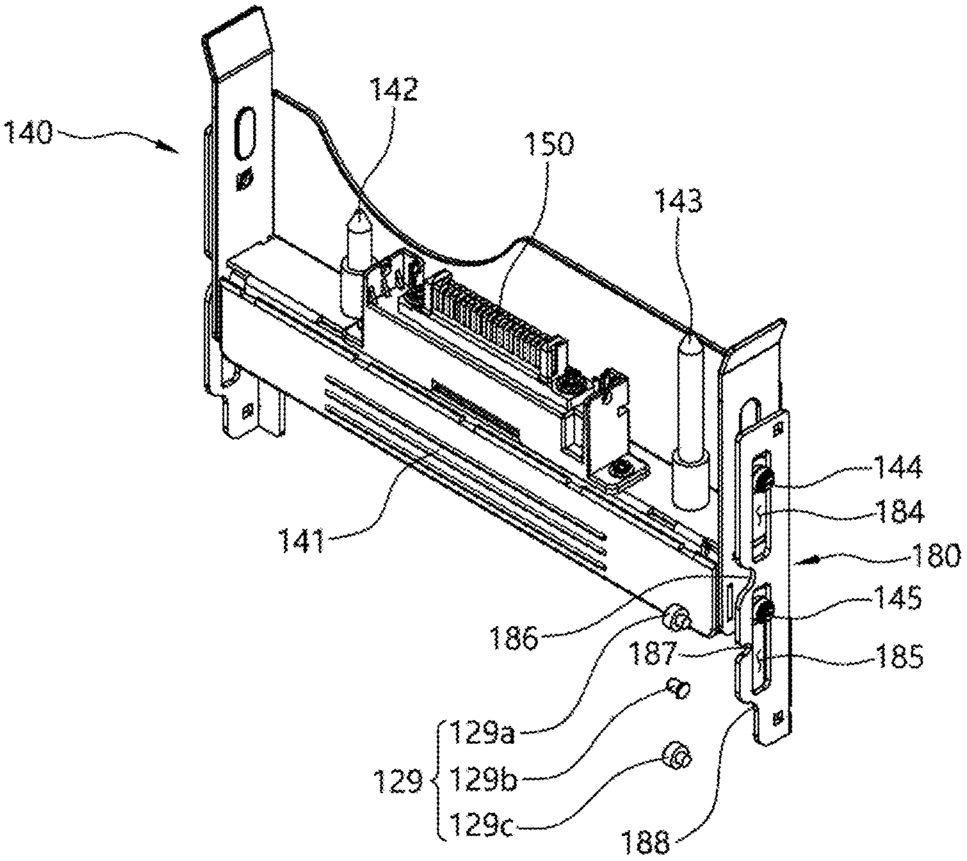

[FIG. 24]
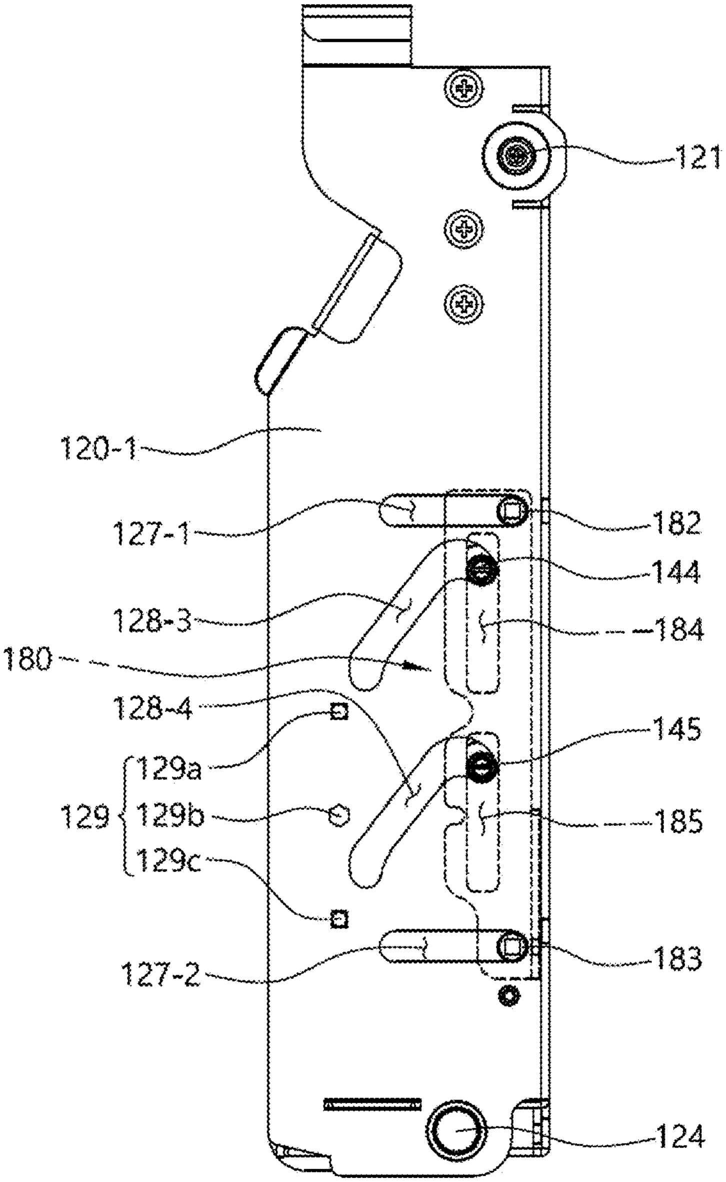

CASSETTE HOLDER FOR AUTOMATED TELLER MACHINE

BACKGROUND

1. Field of the Invention

The present invention relates to a cassette holder for an automated teller machine, and more particularly, to a cassette holder for an automated teller machine that allows cassettes of different sizes to be held using a single common-use holder.

2. Discussion of Related Art

Automated teller machines are devices that allow users to deposit or withdraw cash or checks, transfer money to another account, check their account balance, and more without time limitations using cash cards or bankbooks issued by financial institutions and are widely used in the financial industry due to promptly processing financial transactions of users.

Such an automated teller machine has a bill storage unit including a plurality of cassettes in which bills are stored, and a replenishing/recovering cassette is used for the purpose of replenishing the cassettes with bills or recovering bills from the cassettes. A cassette holder for supporting and holding the replenishing/recovering cassette when a transit function for replenishing or recovering bills is performed may be disposed at one side of the bill storage unit of the automated teller machine.

Since the length in the transverse direction and the height in the longitudinal direction of the replenishing/recovering cassette vary according to the specifications thereof, and the positions and directions (horizontal direction or vertical direction) at and in which connectors for transmitting power and control signals applied to cassettes are disposed on the cassettes vary, conventionally, holders that correspond to specifications of different cassettes are provided and used for each cassette, and there is a structural limitation in that a single holder cannot be compatibly used for different cassettes.

The related art of the holder for an automated teller machine is published in Korean Patent Registration No. 10-1628206.

SUMMARY OF THE INVENTION

The present invention is directed to providing a cassette holder for an automated teller machine that allows cassettes of different sizes to be held using a single holder and has a structure compatibly applicable to connectors disposed at different positions and in different directions.

According to an aspect of the present invention, there is provided a cassette holder for an automated teller machine, the cassette holder comprising: a first holding portion configured to hold a first cassette; a second holding portion configured to hold a second cassette having a different size from the first cassette; side links disposed at both side surfaces of the first holding portion and configured to move in a front-rear direction in association with movement of the first holding portion; and a locking means configured to lock or unlock the side links in a state in which the first holding portion is moved to a second position, wherein the first holding portion is provided to be movable in the front-rear direction between a first position at which the first holding portion is positioned at a front side of the second holding portion to hold the first cassette in the first holding portion and the second position at which the first holding portion is positioned at a rear side of the second holding portion to hold the second cassette in the second holding portion.

Wherein one or more sloped guide pins protruding outward are disposed at both side surfaces of the first holding portion; one or more vertical guide holes having a length in an up-down direction to allow the one or more sloped guide pins to move upward and downward after being inserted thereinto are formed in the side links; and one or more sloped guide holes having a length in a sloped direction to allow the one or more sloped guide pins inserted into the one or more vertical guide holes to move in the sloped direction after being inserted thereinto are formed in both side surfaces of the second holding portion.

Wherein the sloped guide hole includes a sloped portion formed to have a predetermined length in the sloped direction and a vertical portion formed to have a predetermined length and extend downward from a front end portion of the sloped portion to fix and support the sloped guide pin of the first holding portion moved to the first position.

Wherein one or more horizontal guide pins protruding outward are disposed at the side link; and one or more horizontal guide holes having a length in the front-rear direction to allow the one or more horizontal guide pins to move in the front-rear direction after being inserted thereinto are formed in both side surfaces of the second holding portion.

Wherein the locking means is formed of a lock mechanism configured to lock or unlock the side link; the lock mechanism is provided to be able to move upward and downward within a predetermined clearance range on one side surface of the second holding portion; and a lock groove is formed to lock or unlock the horizontal guide pin in a state in which the first holding portion is moved to the second position.

Wherein the lock mechanism is supported by an elastic member to maintain a state in which the horizontal guide pin is locked in the lock groove; and a handle portion configured to apply a force in a direction opposite to a direction of an elastic force of the elastic member so that the horizontal guide pin is unlocked from the lock groove is disposed at the lock mechanism.

Wherein one or more lifting/lowering pins are formed to protrude outward from one side surface of the second holding portion; and one or more slots having a length in an up-down direction and into which the one or more lifting/lowering pins are inserted are formed in the lock mechanism.

Wherein the locking means is formed of a slot in which a lock groove configured to lock or unlock the side link is formed; one or more sloped guide pins protruding outward are disposed at both side surfaces of the first holding portion; one or more vertical guide holes having a length in an up-down direction to allow the one or more sloped guide pins to move upward and downward after being inserted thereinto are formed in the side links; and one or more slots having a length in a sloped direction to allow the one or more sloped guide pins inserted into the one or more vertical guide holes to move in the sloped direction after being inserted thereinto are formed in both side surfaces of the second holding portion.

Wherein the slot includes a sloped portion formed to have a predetermined length in the sloped direction, a vertical portion formed to have a predetermined length and extend downward from a front end portion of the sloped portion to fix and support the sloped guide pin of the first holding portion moved to the first position, and the lock groove formed to have a predetermined length and extend to be sloped downward from a rear end portion of the sloped portion to fix and support the sloped guide pin of the first holding portion moved to the second position.

Wherein one or more stoppers are disposed at one side surface of the second holding portion; and one or more catching grooves configured to limit a forward movement range of the first holding portion as the stoppers are caught therein when the first holding portion moves to the first position are formed in the side link.

Wherein a first connector connecting portion connected to a first connector disposed on a bottom surface of the first cassette is disposed at the first holding portion; and the first connector connecting portion is disposed to maintain an upright state when the first holding portion is positioned at the first position or the second position.

Further comprising: a frame configured to support the first holding portion and the second holding portion; a support member configured to support a front surface of the first cassette or the second cassette and configured to be rotatable in the front-rear direction about a support shaft connected to a lower portion of the frame in a transverse direction; and a link member having both ends rotatably connected to the second holding portion and the support member to allow an angle between the second holding portion and the support member to be adjusted.

Wherein the second holding portion has a lower portion provided to be rotatable in the front-rear direction about the support shaft and an upper portion to which a movement shaft is coupled in the transverse direction; and both ends of the movement shaft are provided to be movable within a predetermined angle range in the front-rear direction within guide holes formed in the front-rear direction in both side surfaces of an upper portion of the frame.

Wherein a first connector connecting portion connected to a first connector disposed on a bottom surface of the first cassette is disposed at the first holding portion; and a second connector connecting portion connected to a second connector disposed on a bottom surface of the second cassette is disposed at the second holding portion.

Wherein the first connector connecting portion is connected to the first connector having a length in one direction and disposed on the bottom surface of the first cassette; and the second connector connecting portion is connected to the second connector having a length in a different direction from the first connector and disposed on the bottom surface of the second cassette.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a view illustrating a use state of a cassette holder when bills are replenished or recovered through cassettes in an automated teller machine according to one embodiment of the present invention;

FIGS. 2A and 2B are a front view and a bottom view, respectively, of a first cassette that can be held in a cassette holder for an automated teller machine according to the present invention, and FIGS. 2C and 2D are a front view and a bottom view, respectively, of a second cassette that can be held in the cassette holder for an automated teller machine;

FIG. 3 is a perspective view illustrating a state in which a first holding portion is moved forward when the first cassette is held in the cassette holder for an automated teller machine according to a first embodiment of the present invention;

FIG. 4 is a front view of FIG. 3;

FIG. 5 is a perspective view of a main part of FIG. 3;

FIG. 6 is a perspective view of a side link illustrated in FIG. 5;

FIG. 7 is a right side view of a second holding portion illustrated in FIG. 5;

FIG. 8 is a perspective view of a lock mechanism illustrated in FIG. 5;

FIG. 9 is a view illustrating the position relation between the side link and the lock mechanisms in the state of FIG. 5;

FIG. 10 is a right side view of FIG. 5;

FIG. 11 is a perspective view illustrating a state in which the first holding portion is moved rearward when the second cassette is held in the cassette holder for an automated teller machine according to the first embodiment of the present invention;

FIG. 12 is a perspective view of a main part of FIG. 11;

FIG. 13 is a view illustrating the position relation between the side link and the lock mechanisms in the state of FIG. 11;

FIG. 14 is a right side view of FIG. 12;

FIG. 15 is a perspective view illustrating a state in which the first holding portion is moved forward when the first cassette is held in the cassette holder for an automated teller machine according to a second embodiment of the present invention;

FIG. 16 is a front view of FIG. 15;

FIG. 17 is a perspective view of a main part of FIG. 15;

FIG. 18 is a right side view of a second holding portion illustrated in FIG. 17;

FIG. 19 is a view illustrating the position relation between a side link and a stopper in the state of FIG. 17;

FIG. 20 is a right side view of FIG. 17;

FIG. 21 is a perspective view illustrating a state in which the first holding portion is moved rearward when the second cassette is held in the cassette holder for an automated teller machine according to the second embodiment of the present invention;

FIG. 22 is a perspective view of a main part of FIG. 21;

FIG. 23 is a view illustrating the position relation between the side link and the stopper in the state of FIG. 21; and FIG. 24 is a right side view of FIG. 23.

DETAILED DESCRIPTION OF EXEMPLARY EMBODIMENTS

Hereinafter, configurations and effects relating to exemplary embodiments of the present invention will be described in detail with reference to the accompanying drawings.

Referring to FIG. 1, an automated teller machine 1 according to one embodiment of the present invention includes a cassette holder 100, a deposit/withdrawal portion 200, a distinguishing portion 300, a temporary storage portion 400, a bill storage portion 500, a conveying path 600, a door 700, a cover 800, and a replenishment port 900.

The cassette holder 100 may be disposed at a lower side of the replenishment port 900, disposed at an outer side of the door 700 opening and closing the bill storage portion 500, and opened and closed by the cover 800. In a state in which the cover 800 is open, replenishment cassettes 10 and 20 through which bills can be replenished or recovered may be mounted on the cassette holder 100.

The deposit/withdrawal portion 200 provides a deposit/withdrawal space for inserting or receiving bills.

The distinguishing portion 300 distinguishes the types of bills passing through the conveying path 600, whether the bills have abnormalities, and the like. When bills are deposited and counted, normal bills distinguished as bills without abnormalities by the distinguishing portion 300 may be temporarily stored in the temporary storage portion 400, and bills distinguished as bills with abnormalities by the distinguishing portion 300 may be conveyed through the deposit/withdrawal portion 200 and returned to a user.

The temporary storage portion 400 provides a storage space that can temporarily store bills distinguished by the distinguishing portion 300.

The bill storage portion 500 provides a space in which bills are stored and may include a plurality of cassettes 510 having different sizes according to the types of bills.

The conveying path 600 may provide a movement path for bills deposited and withdrawn through the deposit/withdrawal portion 200 and may provide a bill movement path for replenishing/recovering bills.

The door 700 is a component for opening and closing one side surface of the bill storage portion 500, and the cassette holder 100 may be disposed at an outer side surface of the door 700.

The cover 800 may be open for the cassette holder 100 to be exposed to the outside when the cassette holder 100 is used to replenish/recover bills and may be closed for the cassette holder 100 to not be exposed to the outside when the cassette holder 100 is not in use.

A connecting conveying path 601 connected to the replenishment cassettes 10 and 20 when bills are replenished or recovered is disposed at the replenishment port 900, and the connecting conveying path 601 is connected to the cassettes 510 of the bill storage portion 500 through the conveying path 600.

The configuration of the automated teller machine 1 is only an example for assisting understanding of the present embodiment, and the configuration may be substituted with another configuration or modified as necessary.

FIG. 2 shows the replenishment cassettes 10 and 20 applied to the present embodiment and illustrates a first cassette 10 having a predetermined volume and a second cassette 20 having a larger volume than the first cassette 10. Referring to FIGS. 2A and 2C, the first cassette 10 is configured to have a shorter width and a lower height than the second cassette 20, and the second cassette 20 is configured to have a longer width and a higher height than the first cassette 10.

Also, referring to FIGS. 2B and 2D, a first connector 11 disposed on a bottom surface of the first cassette 10 and a second connector 21 disposed on a bottom surface of the second cassette 20 may be installed at different positions and disposed to have different longitudinal directions.

In one embodiment, based on the directions illustrated in FIGS. 2B and 2D, the first connector 11 may be disposed on a middle portion of a lower portion of the bottom surface of the first cassette 10 to have a length in the horizontal direction, and the second connector 21 may be disposed on a middle portion of a left side of the bottom surface of the second cassette 20 to have a length in the vertical direction.

The present embodiment provides the cassette holder 100 for an automated teller machine that is able to hold the first cassette 10 and the second cassette 20 having different sizes as described above and can be compatibly applied to the first connector 11 and the second connector 21 disposed at different positions and in different directions.

Hereinafter, configurations and effects of the cassette holder 100 for an automated teller machine according to a first embodiment of the present invention will be described. In referring to directions in the present specification, the X-X' direction illustrated in FIG. 3 will be referred to as the front-rear direction, the Y-Y' direction will be referred to as the left-right direction (or transverse direction), the Z-Z' direction will be referred to as the up-down direction, the X-direction will be referred to as forward, and the X'-direction will be referred to as rearward.

Referring to FIGS. 3 and 4, the cassette holder 100 for an automated teller machine according to the first embodiment of the present invention includes a first holding portion 140 configured to hold the first cassette 10 having a predetermined volume and a second holding portion 120 which has an inner side to which the first holding portion 140 is connected and which is configured to hold the second cassette 20 having a larger volume than the first cassette 10.

The cassette holder 100 includes a frame 110 configured to support the first holding portion 140 and the second holding portion 120, a support member 160 configured to support a front surface of the first cassette 10 or the second cassette 20 and configured to be rotatable in the front-rear direction about a support shaft 124 connected to a lower portion of the frame 110 in the transverse direction, and a link member 170 having both ends rotatably connected to the second holding portion 120 and the support member 160 to allow an angle between the second holding portion 120 and the support member 160 to be adjusted.

The frame 110 may include a rear surface which is coupled to the door 700 described above and has a closed shape, a front surface which is formed to have an open structure to enable the support member 160 and the second holding portion 120 to rotate in the front-rear direction, and both side surfaces which extend a predetermined length forward from both side ends of the rear surface of the frame 110.

Slot-shaped guide holes 111 having a predetermined length in the front-rear direction are formed in upper portions of both side surfaces of the frame 110, and both side ends of a movement shaft 121 coupled to an upper portion of the second holding portion 120 in the transverse direction are positioned at inner sides of the guide holes 111.

A first binding member 122 configured to prevent deviation of the movement shaft 121 is coupled to both side ends of the movement shaft 121 passing through the guide holes 111. Cushioning springs 123 configured to absorb an impact between the first binding member 122 and the guide holes 111 when the second holding portion 120 is rotated forward may be disposed at front portions of the guide holes 111.

Both side ends of the support shaft 124 disposed in the transverse direction are coupled to both side surfaces of the frame 110. The support shaft 124 serves as a center of rotation around which the second holding portion 120 and the support member 160 rotate.

The second holding portion 120 is a component for holding the second cassette 20 having a relatively large volume, and a width between both side surfaces of the second holding portion 120 in the left-right direction is formed to have a size that corresponds to a width of the second cassette 20. The movement shaft 121 is connected to pass through upper portions of both side surfaces of the second holding portion 120, and the support shaft 124 is connected to pass through lower portions of both side surfaces of the second holding portion 120. When the second holding portion 120 is rotated forward or rearward, the second holding portion 120 may be rotated about the support shaft 124, and both ends of the movement shaft 121 may move within a predetermined angle range in the front-rear direction along the guide holes 111. The second cassette 20 is inserted between the second holding portion 120 and the support member 160, and the second holding portion 120 supports the rear surface, both side surfaces, and the bottom surface of the second cassette 20.

A second connector connecting portion 130 connected to the second connector 21 of the second cassette 20 is installed on the bottom surface of the second holding portion 120.

When the support member 160 rotates forward during use of the cassette holder 100, the second connector connecting portion 130 is rotated forward in association therewith and is positioned parallel to the front-rear direction.

When the support member 160 rotates rearward while the cassette holder 100 is not in use, the second connector connecting portion 130 is rotated rearward in association therewith and is positioned at an inner side of the frame 110 and positioned parallel to the left-right direction. In this way, the size occupied by the cassette holder 100 in the front-rear direction while the cassette holder 100 is not in use may be reduced.

The first holding portion 140 is a component for holding the first cassette 10 having a relatively small volume, and a width between both side surfaces of the first holding portion 140 in the left-right direction is formed to have a size that corresponds to a width of the first cassette 10. The first cassette 10 is inserted between the first holding portion 140 and the support member 160, and the first holding portion 140 supports the rear surface, both side surfaces, and the bottom surface of the first cassette 10. A first connector connecting portion 150 connected to the first connector 11 of the first cassette 10 is installed on the bottom surface of the first holding portion 140. Guide rods 142 and 143 configured to guide the first cassette 10 to be held at a correct position in the first holding portion 140 may be disposed at both sides of the first connector connecting portion 150 in the first holding portion 140, and guide grooves (not illustrated) into which the guide rods 142 and 143 are inserted may be formed in a bottom surface of the first cassette 10.

The support member 160 is a component for supporting a front surface portion of the first cassette 10 held in the first holding portion 140 or the second cassette 20 held in the second holding portion 120. The support shaft 124 may be connected to pass through lower portions of both side surfaces of the support member 160 in the transverse direction, and the support member 160 may be rotated in the front-rear direction about the support shaft 124. A handle portion 161 may be disposed at an upper portion of the support member 160 to be easily gripped by a worker.

A fixing pin 162 is formed to protrude from one side surface of an upper end of the support member 160, a catching groove 125*a* in which the fixing pin 162 is caught in a state in which the support member 160 is folded toward an inner side of the frame 110 is formed and a hook member 125 that can be lifted and lowered in the up-down direction within a predetermined clearance range is disposed at an inner side of one side surface of the frame 110, a handle portion 125*b* for pressing the hook member 125 downward to release a state in which the fixing pin 162 is caught in the catching groove 125*a* is disposed at a front end portion of the hook member 125, and an elastic member 126 (see FIG. 4) configured to apply an elastic force to maintain the state in which the fixing pin 162 is caught in the catching groove 125*a* is connected to the hook member 125.

The link member 170 is provided as a pair of link members 170 at both sides, and the link members 170 are components configured to connect both side surfaces of the second holding portion 120 and both side surfaces of the support member 160 to each other and adjust an opening angle between the second holding portion 120 and the support member 160. Second binding members 172 coupled to be rotatable relative to both side surfaces of the second holding portion 120 are disposed at rear end portions of the link members 170 in the longitudinal direction thereof, and third binding members 173 coupled to be rotatable relative to both side surfaces of the support member 160 are disposed at front end portions of the link members 170 in the longitudinal direction thereof. Also, a slot 171 is formed in each link member 170 in the longitudinal direction thereof, and the second binding member 172 is supported to be movable in the longitudinal direction of the slot 171 inside the slot 171.

When the support member 160 is rotated forward as much as possible to hold the first cassette 10 or the second cassette 20 in the cassette holder 100, the second binding members 172 move to and are positioned at rear end portions of the slots 171, and the opening angle between the second holding portion 120 and the support member 160 becomes maximum.

When the support member 160 is rotated rearward as much as possible while the cassette holder 100 is not in use, the second binding members 172 move to and are positioned at front end portions of the slots 171, and the angle between the second holding portion 120 and the support member 160 becomes minimum and the support member 160 is folded.

Also, the angle between the first holding portion 140 and the support member 160 is also adjusted according to the rotation of the support member 160 in the front-rear direction.

The first holding portion 140 is provided to be movable in the front-rear direction between a first position at which the first holding portion 140 is positioned at a front side of the second holding portion 120 to hold the first cassette 10 in the first holding portion 140 and a second position at which the first holding portion 140 is positioned at a rear side of the second holding portion 120 to hold the second cassette 20 in the second holding portion 120.

FIGS. 3 to 5, 9, and 10 illustrate a state in which the first holding portion 140 is at the first position after moving forward to hold the first cassette 10, and FIGS. 11 to 14 illustrate a state in which the first holding portion 140 is at the second position after moving rearward to hold the second cassette 20.

When the first holding portion 140 moves to the second position, the second cassette 20 may be held in the second holding portion 120 without interfering with the first holding portion 140.

The first connector connecting portion 150 connected to the first connector 11 disposed at the bottom surface of the first cassette 10 is disposed at the first holding portion 140, and the first connector connecting portion 150 is disposed to maintain an upright state when the first holding portion 140 is positioned at the first position or the second position. By the first connector connecting portion 150 maintaining an upright state at the first position and the second position in this way, connection between the first connector connecting portion 150 and the first connector 11 may be performed at a correct position, and erroneous connection and damage to the components that may be caused when the first connector connecting portion 150 and the first connector 11 are not at correct positions in the connection process may be prevented.

Hereinafter, configurations and effects of the cassette holder 100 for supporting the first holding portion 140 while maintaining an upright state of the first holding portion 140 when the first holding portion 140 moves between the first position and the second position and supporting the first holding portion 140 while stably fixing the first holding portion 140 in a state in which the first holding portion 140 is moved to the first position or the second position will be described.

Referring to FIGS. 5 to 10, the cassette holder 100 includes side links 180 disposed at both side surfaces of the first holding portion 140 and configured to move in the front-rear direction in association with the movement of the first holding portion 140 and lock mechanisms 190 that serve as locking means configured to lock or unlock the side links 180 in the state in which the first holding portion 140 is moved to the second position.

One or more sloped guide pins 144 and 145 (see FIG. 9) protruding outward are disposed at both side surfaces of the first holding portion 140. In one embodiment, the sloped guide pins 144 and 145 may consist of a first sloped guide pin 144 and a second sloped guide pin 145 disposed at vertically spaced-apart positions at both side surfaces of the first holding portion 140.

Referring to FIG. 6, the side link 180 includes a side link body 181 formed in a plate shape having a length in the up-down direction, and one or more vertical guide holes 184 and 185 formed in the side link body 181 and having a length in the up-down direction to allow the one or more sloped guide pins 144 and 145 to move upward and downward after being inserted thereinto.

In one embodiment, the vertical guide holes 184 and 185 consist of a first vertical guide hole 184 and a second vertical guide hole 185 formed at vertically spaced-apart positions, the first sloped guide pin 144 is inserted into and positioned in the first vertical guide hole 184, and the second sloped guide pin 145 is inserted into and positioned in the second vertical guide hole 185.

One or more horizontal guide pins 182 and 183 protruding outward are disposed at the side link 180. In one embodiment, the horizontal guide pins 182 and 183 may consist of a first horizontal guide pin 182 disposed at an upper portion of the side link body 181 and a second horizontal guide pin 183 disposed at a lower portion of the side link body 181.

Catching grooves 186, 187, and 188 configured to limit a forward movement range of the first holding portion 140 as stoppers 129 (129*a*, 129*b*, and 129*c*; see FIG. 9), which will be described below, disposed at the second holding portion 120 are caught therein when the first holding portion 140 moves to the first position may be formed at vertically spaced-apart positions at a front side end of the side link 180.

Referring to FIG. 7, one or more sloped guide holes 128-1 and 128-2 having a length in a sloped direction to allow the one or more sloped guide pins 144 and 145 inserted into the one or more vertical guide holes 184 and 185 to move in the sloped direction after being inserted thereinto may be formed in both side surfaces of the second holding portion 120. In one embodiment, the sloped guide holes 128-1 and 128-2 may consist of a first sloped guide hole 128-1 and a second sloped guide hole 128-2 formed at vertically spaced-apart positions.

The sloped guide holes 128-1 and 128-2 may include sloped portions 128-1*a* and 128-2*a* formed to have a predetermined length in the sloped direction and vertical portions 128-1*b* and 128-2*b* formed to have a predetermined length and extend downward from front end portions of the sloped portions 128-1*a* and 128-2*a* to fix and support the sloped guide pins 144 and 145 of the first holding portion 140 moved to the first position.

One or more horizontal guide holes 127-1 and 127-2 having a length in the front-rear direction to allow the one or more horizontal guide pins 182 and 183 to move in the front-rear direction after being inserted thereinto may be formed in both side surfaces of the second holding portion 120. In one embodiment, the horizontal guide holes 127-1 and 127-2 may consist of a first horizontal guide hole 127-1 in which the first horizontal guide pin 182 is inserted and positioned and a second horizontal guide hole 127-2 in which the second horizontal guide pin 183 is inserted and positioned.

In FIG. 7, the reference numeral "120*a*" represents a movement shaft through-hole through which the movement shaft 121 passes, the reference numeral "120*b*" represents a support shaft through-hole through which the support shaft 124 passes, the reference numeral "120*c*" represents a first lifting/lowering pin through-hole through which a first lifting/lowering pin 190*a* (see FIG. 9) passes, the reference numeral "120*d*" represents a second lifting/lowering pin through-hole through which a second lifting/lowering pin 190*b* (see FIG. 9) passes, and the reference numeral "120*e*" represents an elastic member support piece configured to support a lower end of an elastic member 199 (see FIG. 12) constituting the lock mechanism 190.

Referring to FIG. 8, the lock mechanism 190 includes a lock mechanism body 191 having a length in the up-down direction and provided to be lifted and lowered within a predetermined clearance range on one side surface of the second holding portion 120, and a hook-shaped look groove 192 formed in the lock mechanism body 191 to lock or unlock the first horizontal guide pin 182 in a state in which the first holding portion 140 is moved to the second position.

The lock mechanism 190 is supported by the elastic member 199 (see FIG. 12) so that the first horizontal guide pin 182 remains locked in the lock groove 192.

A flange portion 193 is formed at an upper end portion of the lock mechanism body 191, and an elastic member through-hole 193*a* and an elastic member support hole 193*b* into which an upper end of the elastic member 199 is inserted to be supported are formed in the flange portion 193.

A lower end of the elastic member 199 is supported by the elastic member support piece 120*e* (see FIG. 7) passing through an elastic member support piece through-hole 195.

The elastic member 199 applies a downward elastic force to the lock mechanism body 191 so that the first horizontal guide pin 182 remains locked in the lock groove 192 in the state in which the first holding portion 140 is moved to the second position.

The lock mechanism body 191 is provided to be lifted and lowered within a predetermined clearance range in the up-down direction. Referring to FIGS. 8 and 10, a first slot 196 and a second slot 197 having a length in the up-down direction are formed at vertically spaced-apart positions in the lock mechanism body 191, and the first lifting/lowering pin 190*a* and the second lifting/lowering pin 190*b* coupled to the second holding portion 120 are inserted into the first slot 196 and the second slot 197, respectively, to guide the lifting/lowering movement of the lock mechanism body 191.

In order to release the locked state between the first horizontal guide pin 182 and the lock groove 192, the first holding portion 140 is pulled forward and moved in a state in which a handle portion 194 is lifted upward, which is the direction opposite to the direction of the elastic force of the elastic member 199.

Referring to FIGS. 9 and 10, when the first holding portion 140 is moved forward and positioned at the first position to hold the first cassette 10, the sloped guide pins 144 and 145 are positioned at lower end portions of the vertical guide holes 184 and 185 while positioned at the vertical portions 128-1*b* and 128-2*b* of the sloped guide holes 128-1 and 128-2, the horizontal guide pins 182 and 183 are positioned at front end portions of the horizontal guide holes 127-1 and 127-2, and the stoppers 129 (129*a*, 129*b*, and 129*c*) come in contact with the first to third catching grooves 186, 187, and 188 to support the first holding portion 140 so that the first holding portion 140 does not move forward past the first position.

Referring to FIGS. 11 to 14, when the first holding portion 140 is moved rearward and positioned at the second position to hold the second cassette 20, the sloped guide pins 144 and 145 are positioned at upper end portions of the vertical guide holes 184 and 185 while positioned at upper end portions of the sloped portions 128-1*a* and 128-2*a* of the sloped guide holes 128-1 and 128-2, the horizontal guide pins 182 and 183 are positioned at rear end portions of the horizontal guide holes 127-1 and 127-2, and the first horizontal guide pin 182 is fixed and supported in a state in which the first horizontal guide pin 182 is caught in the lock groove 192 of the lock mechanism 190 and locked.

As described above, in the present embodiment, the sloped guide pins 144 and 145 coupled to the first holding portion 140 are doubly supported by the sloped guide holes 128-1 and 128-2 formed in the side surfaces of the second holding portion 120 and the vertical guide holes 184 and 185 formed in the side links 180, and the horizontal guide pins 182 and 183 coupled to the side links 180 are supported by the horizontal guide holes 127-1 and 127-2 formed in the side surfaces of the second holding portion 120. In this way, when the first holding portion 140 moves between the first position and the second position, the first holding portion 140 and the first connector connecting portion 150 disposed thereon may move while maintaining an upright state without tilting forward or rearward, and an avoidance structure of the first holding portion 140 for holding the second cassette 20 may be simplified.

Hereinafter, configurations and effects of a cassette holder 100-1 for an automated teller machine according to a second embodiment of the present invention will be described. The same reference numerals will be used for the same components as the first embodiment described above, detailed description of content overlapping with the content described above in relation to the first embodiment will be omitted, and components newly added or modified in the second embodiment will be mainly described.

Referring to FIGS. 15 and 16, the cassette holder 100-1 for an automated teller machine according to the second embodiment of the present invention includes a first holding portion 140 configured to hold a first cassette 10 having a predetermined volume and a second holding portion 120-1 which has an inner side to which the first holding portion 140 is connected and which is configured to hold a second cassette 20 having a larger volume than the first cassette 10, and as in the first embodiment, includes a frame 110, a second connector connecting portion 130, a first connector connecting portion 150, a support member 160, link member 170, and side links 180.

The first holding portion 140 is provided to be movable in the front-rear direction between a first position at which the first holding portion 140 is positioned at a front side of the second holding portion 120-1 to hold the first cassette 10 in the first holding portion 140 and a second position at which the first holding portion 140 is positioned at a rear side of the second holding portion 120-1 to hold the second cassette 20 in the second holding portion 120.

FIGS. 15 to 17, 19, and 20 illustrate a state in which the first holding portion 140 is at the first position after moving forward to hold the first cassette 10, and FIGS. 21 to 24 illustrate a state in which the first holding portion 140 is at the second position after moving rearward to hold the second cassette 20.

When the first holding portion 140 moves to the second position, the second cassette 20 may be held in the second holding portion 120-1 without interfering with the first holding portion 140.

Hereinafter, configurations and effects of the cassette holder 100-1 for supporting the first holding portion 140 while maintaining an upright state of the first holding portion 140 when the first holding portion 140 moves between the first position and the second position and supporting the first holding portion 140 while stably fixing the first holding portion 140 in a state in which the first holding portion 140 is moved to the first position or the second position will be described.

Referring to FIGS. 17 to 20, the cassette holder 100-1 includes side links 180 disposed at both side surfaces of the first holding portion 140 and configured to move in the front-rear direction in association with the movement of the first holding portion 140 and slots 128-3 and 128-4 that serve as locking means configured to lock or unlock the side links 180 in the state in which the first holding portion 140 is moved to the second position.

The side link 180 has the same structure as in the first embodiment described above.

Referring to FIG. 18, one or more slots 128-3 and 128-4 having a length in a sloped direction to allow the one or more sloped guide pins 144 and 145 inserted into the one or more vertical guide holes 184 and 185 to move in the sloped direction after being inserted thereinto may be formed in both side surfaces of the second holding portion 120-1. In one embodiment, the slots 128-3 and 128-4 may consist of a first slot 128-3 and a second slot 128-4 formed at vertically spaced-apart positions.

The slots 128-3 and 128-4 include sloped portions 128-3*a* and 128-4*a* formed to have a predetermined length in the sloped direction, vertical portions 128-3*b* and 128-4*b* formed to have a predetermined length and extend downward from front end portions of the sloped portions 128-3*a* and 128-4*a* to fix and support the sloped guide pins 144 and 145 of the first holding portion 140 moved to the first position, and lock grooves 128-3*c* and 128-4*c* formed to have a predetermined length and extend to be sloped downward from rear end portions of the sloped portions 128-3*a* and 128-4*a* to fix and support the sloped guide pins 144 and 145 of the first holding portion 140 moved to the second position.

One or more horizontal guide holes 127-1 and 127-2 having a length in the front-rear direction to allow the one or more horizontal guide pins 182 and 183 to move in the front-rear direction after being inserted thereinto may be formed in both side surfaces of the second holding portion 120-1. In one embodiment, the horizontal guide holes 127-1 and 127-2 may consist of a first horizontal guide hole 127-1 in which the first horizontal guide pin 182 is inserted and positioned and a second horizontal guide hole 127-2 in which the second horizontal guide pin 183 is inserted and positioned.

In FIG. 18, the reference numeral "120*a*" represents a movement shaft through-hole through which the movement shaft 121 passes, and the reference numeral "120*b*" represents a support shaft through-hole through which the support shaft 124 passes.

Referring to FIGS. 19 and 20, when the first holding portion 140 is moved forward and positioned at the first position to hold the first cassette 10, the sloped guide pins 144 and 145 are positioned at lower end portions of the vertical guide holes 184 and 185 while positioned at the vertical portions 128-3*b* and 128-4*b* of the slots 128-3 and 128-4, the horizontal guide pins 182 and 183 are positioned at front end portions of the horizontal guide holes 127-1 and 127-2, and the stoppers 129 (129*a*, 129*b*, and 129*c*) come in contact with the first to third catching grooves 186, 187, and 188 to support the first holding portion 140 so that the first holding portion 140 does not move forward past the first position.

Referring to FIGS. 21 to 24, when the first holding portion 140 is moved rearward and positioned at the second position to hold the second cassette 20, the sloped guide pins 144 and 145 are positioned at upper end portions of the vertical guide holes 184 and 185 while fixed and supported in a state in which the sloped guide pins 144 and 145 are caught in the lock grooves 128-3*c* and 128-4*c* of the slots 128-3 and 128-4 and locked, and the horizontal guide pins 182 and 183 are positioned at rear end portions of the horizontal guide holes 127-1 and 127-2.

As described above, in the present embodiment, the sloped guide pins 144 and 145 coupled to the first holding portion 140 are doubly supported by the slots 128-3 and 128-4 formed in the side surfaces of the second holding portion 120-1 and the vertical guide holes 184 and 185 formed in the side links 180, and the horizontal guide pins 182 and 183 coupled to the side links 180 are supported by the horizontal guide holes 127-1 and 127-2 formed in the side surfaces of the second holding portion 120-1. In this way, when the first holding portion 140 moves between the first position and the second position, the first holding portion 140 and the first connector connecting portion 150 disposed thereon may move while maintaining an upright state without tilting forward or rearward, and an avoidance structure of the first holding portion 140 for holding the second cassette 20 may be simplified.

A cassette holder for an automated teller machine according to the present invention allows cassettes of different sizes to be held using a single common-use holder and can be compatibly applied to connectors disposed at different positions and in different directions on different cassettes.

According to a first embodiment of the present invention, since a side link and a lock mechanism are provided as components for fixing and supporting a position to which a first holding portion is moved forward or rearward to hold cassettes of different sizes, an avoidance structure of the first holding portion can be simplified.

According to a second embodiment of the present invention, since a side link and a slot having a lock groove formed therein are provided as components for fixing and supporting a position to which a first holding portion is moved forward or rearward to hold cassettes of different sizes, an avoidance structure of the first holding portion can be simplified.

Exemplary embodiments of the present invention have been described in detail above, but the present invention is not limited to the embodiments described above. Various modifications are possible within the scope of the claims and the detailed description and accompanying drawings of the invention, and such modifications also fall within the present invention.

What is claimed is:

1. A cassette holder for an automated teller machine, the cassette holder comprising:

a first holding portion configured to hold a first cassette;

a second holding portion configured to hold a second cassette having a different size from the first cassette;

side links disposed at both side surfaces of the first holding portion and configured to move in a front-rear direction in association with movement of the first holding portion; and a locking means configured to lock or unlock the side links in a state in which the first holding portion is moved to a second position, wherein the first holding portion is provided to be movable in the front-rear direction between a first position at which the first holding portion is positioned at a front side of the second holding portion to hold the first cassette in the first holding portion and the second position at which the first holding portion is positioned at a rear side of the second holding portion to hold the second cassette in the second holding portion.

2. The cassette holder of claim 1, wherein:

one or more sloped guide pins protruding outward are disposed at both side surfaces of the first holding portion;

one or more vertical guide holes having a length in an up-down direction to allow the one or more sloped guide pins to move upward and downward after being inserted thereinto are formed in the side links; and one or more sloped guide holes having a length in a sloped direction to allow the one or more sloped guide pins inserted into the one or more vertical guide holes to move in the sloped direction after being inserted thereinto are formed in both side surfaces of the second holding portion.

3. The cassette holder of claim 2, wherein the sloped guide hole includes a sloped portion formed to have a predetermined length in the sloped direction and a vertical portion formed to have a predetermined length and extend downward from a front end portion of the sloped portion to fix and support the sloped guide pin of the first holding portion moved to the first position.

4. The cassette holder of claim 1, wherein:

one or more horizontal guide pins protruding outward are disposed at the side links; and one or more horizontal guide holes having a length in the front-rear direction to allow the one or more horizontal guide pins to move in the front-rear direction after being inserted thereinto are formed in both side surfaces of the second holding portion.

5. The cassette holder of claim 4, wherein:

the locking means is formed of a lock mechanism configured to lock or unlock the side links;

the lock mechanism is provided to be able to move upward and downward within a predetermined clearance range on one side surface of the second holding portion; and a lock groove is formed to lock or unlock the horizontal guide pin in a state in which the first holding portion is moved to the second position.

6. The cassette holder of claim 5, wherein:

the lock mechanism is supported by an elastic member to maintain a state in which the horizontal guide pin is locked in the lock groove; and a handle portion configured to apply a force in a direction opposite to a direction of an elastic force of the elastic member so that the horizontal guide pin is unlocked from the lock groove is disposed at the lock mechanism.

7. The cassette holder of claim 6, wherein:

one or more lifting/lowering pins are formed to protrude outward from one side surface of the second holding portion; and one or more slots having a length in an up-down direction and into which the one or more lifting/lowering pins are inserted are formed in the lock mechanism.

8. The cassette holder of claim 1, wherein:

the locking means is formed of a slot in which a lock groove configured to lock or unlock the side links is formed;

one or more sloped guide pins protruding outward are disposed at both side surfaces of the first holding portion;

one or more vertical guide holes having a length in an up-down direction to allow the one or more sloped guide pins to move upward and downward after being inserted thereinto are formed in the side links; and one or more slots having a length in a sloped direction to allow the one or more sloped guide pins inserted into the one or more vertical guide holes to move in the sloped direction after being inserted thereinto are formed in both side surfaces of the second holding portion.

9. The cassette holder of claim 8, wherein the slot includes a sloped portion formed to have a predetermined length in the sloped direction, a vertical portion formed to have a predetermined length and extend downward from a front end portion of the sloped portion to fix and support one or more sloped guide pins of the first holding portion moved to the first position, and the lock groove formed to have a predetermined length and extend to be sloped downward from a rear end portion of the sloped portion to fix and support the one or more sloped guide pins of the first holding portion moved to the second position.

10. The cassette holder of claim 1, wherein:

one or more stoppers are disposed at one side surface of the second holding portion; and one or more catching grooves configured to limit a forward movement range of the first holding portion as the stoppers are caught therein when the first holding portion moves to the first position are formed in the side links.

11. The cassette holder of claim 1, wherein:

a first connector connecting portion connected to a first connector disposed on a bottom surface of the first cassette is disposed at the first holding portion; and the first connector connecting portion is disposed to maintain an upright state when the first holding portion is positioned at the first position or the second position.

12. The cassette holder of claim 1, wherein:

a first connector connecting portion connected to a first connector disposed on a bottom surface of the first cassette is disposed at the first holding portion; and a second connector connecting portion connected to a second connector disposed on a bottom surface of the second cassette is disposed at the second holding portion.

13. The cassette holder of claim 12, wherein:

the first connector connecting portion is connected to the first connector having a length in one direction and disposed on the bottom surface of the first cassette; and the second connector connecting portion is connected to the second connector having a length in a different direction from the first connector and disposed on the bottom surface of the second cassette.

* * * * *